(12) United States Patent
Naito

(10) Patent No.: US 10,542,173 B2
(45) Date of Patent: Jan. 21, 2020

(54) INFORMATION PROCESSING APPARATUS FOR TRANSMITTING DATA USING DESTINATION AND TRANSMISSION SETTING RECEIVED FROM AN EXTERNAL APPARATUS, METHOD FOR CONTROLLING INFORMATION PROCESSING APPARATUS, AND STORAGE MEDIUM

(71) Applicant: CANON KABUSHIKI KAISHA, Tokyo (JP)

(72) Inventor: Yosui Naito, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/370,895

(22) Filed: Dec. 6, 2016

(65) Prior Publication Data

US 2017/0171414 A1 Jun. 15, 2017

(30) Foreign Application Priority Data

Dec. 11, 2015 (JP) .................... 2015-242206

(51) Int. Cl.
  *H04N 1/00* (2006.01)
  *H04M 1/725* (2006.01)
  *H04N 1/32* (2006.01)

(52) U.S. Cl.
  CPC ...... *H04N 1/00973* (2013.01); *H04M 1/7253* (2013.01); *H04N 1/00212* (2013.01); *H04N 1/00225* (2013.01); *H04N 1/00307* (2013.01); *H04N 1/32106* (2013.01); *H04N 2201/0075* (2013.01); *H04N 2201/0094* (2013.01); *H04N 2201/3208* (2013.01)

(58) Field of Classification Search
  CPC .......... H04N 1/00973; H04N 1/00212; H04N 1/00307; H04N 1/32106; H04N 1/00225; H04N 2201/3208; H04N 2201/0094; H04N 2201/0075; H04W 4/008; H04M 1/7253
  See application file for complete search history.

(56) References Cited

U.S. PATENT DOCUMENTS

| | | | |
|---|---|---|---|
| 7,576,752 B1 * | 8/2009 | Benson | G06F 3/1415 345/619 |
| 2005/0015428 A1 * | 1/2005 | Ferlitsch | H04N 1/00214 709/200 |
| 2005/0099654 A1 * | 5/2005 | Chen | H04N 1/00209 358/1.15 |

(Continued)

FOREIGN PATENT DOCUMENTS

| | | |
|---|---|---|
| CN | 101945201 A | 1/2011 |
| CN | 103259839 A | 8/2013 |

(Continued)

*Primary Examiner* — Ming Y Hon
(74) *Attorney, Agent, or Firm* — Canon U.S.A., Inc., IP Division

(57) ABSTRACT

An information processing apparatus including a transmission function of transmitting data receives data including at least a destination field and a data field set to be transferred. Setting is performed so that a setting included in a field in the received data is added to a setting previously set as a setting for the transmission function. Data is transmitted to destinations that have been set as settings for the transmission function.

14 Claims, 18 Drawing Sheets

(56) References Cited

U.S. PATENT DOCUMENTS

| | | | |
|---|---|---|---|
| 2005/0174593 A1* | 8/2005 | Piersol | H04N 1/32101 358/1.13 |
| 2006/0126114 A1* | 6/2006 | Choi | H04N 1/00347 358/1.15 |
| 2006/0190496 A1* | 8/2006 | Tsunoda | H04N 1/00477 |
| 2007/0239877 A1* | 10/2007 | Uchida | H04M 1/7253 709/228 |
| 2008/0046467 A1* | 2/2008 | Nakajima | G06F 12/1458 |
| 2009/0199214 A1* | 8/2009 | Asahara | G06F 9/4443 719/320 |
| 2009/0327246 A1* | 12/2009 | Sato | G06F 17/30011 |
| 2010/0245904 A1* | 9/2010 | Nishiyama | H04N 1/00214 358/1.15 |
| 2011/0267658 A1* | 11/2011 | Maeshima | H04N 1/00408 358/448 |
| 2012/0176646 A1* | 7/2012 | Furuta | H04N 1/32128 358/1.15 |
| 2012/0250099 A1* | 10/2012 | Kanemoto | H04N 1/00206 358/435 |
| 2012/0257234 A1* | 10/2012 | Kanuma | H04N 1/32112 358/1.13 |
| 2013/0258381 A1* | 10/2013 | Sato | G06F 3/1297 358/1.13 |
| 2013/0271402 A1* | 10/2013 | Arakawa | G06F 3/041 345/173 |
| 2014/0253965 A1* | 9/2014 | Asai | G06F 3/1205 358/1.15 |
| 2014/0293328 A1* | 10/2014 | Wakizaka | G06F 3/1292 358/1.15 |
| 2014/0327787 A1 | 11/2014 | Tsujimoto | |
| 2015/0055174 A1* | 2/2015 | Baba | G03G 15/502 358/1.15 |
| 2015/0146249 A1* | 5/2015 | Dohi | H04N 1/00477 358/1.15 |
| 2015/0215491 A1* | 7/2015 | Faust | G06F 17/241 715/780 |
| 2016/0269573 A1* | 9/2016 | Sugita | G06F 3/1292 |
| 2016/0286073 A1* | 9/2016 | Kogure | H04N 1/32037 |
| 2017/0149986 A1* | 5/2017 | Kasuya | H04N 1/00222 |

FOREIGN PATENT DOCUMENTS

| | | |
|---|---|---|
| CN | 104012070 A | 8/2014 |
| CN | 104935776 A | 9/2015 |
| CN | 106060304 A | 10/2016 |
| JP | 2004-088612 A | 3/2004 |
| JP | 2005-79800 A | 3/2005 |
| JP | 2009-237716 A | 10/2009 |
| JP | 2014-195151 A | 10/2014 |
| JP | 2014-195877 A | 10/2014 |
| JP | 2015-041795 A | 3/2015 |

* cited by examiner

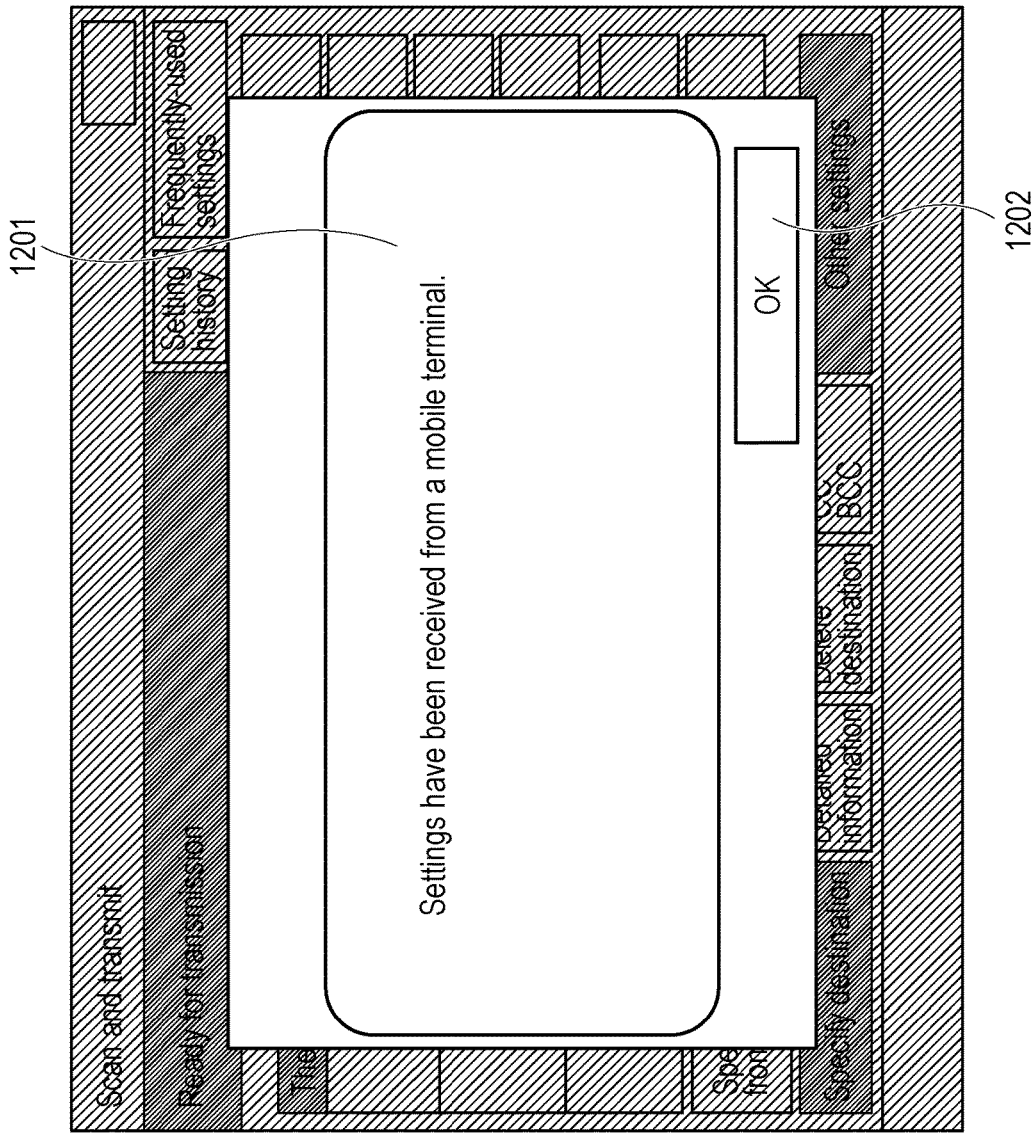

FIG. 14

| Bit | ITEM | MFP A | MFP B | MFP C |
|---|---|---|---|---|
| 1 | MAIL ADDRESS | 1 | 1 | 1 |
| 2 | TITLE | 1 | 1 | 1 |
| 3 | TEXT BODY | 1 | 1 | 1 |
| 4 | FILE NAME | 1 | 0 | 1 |

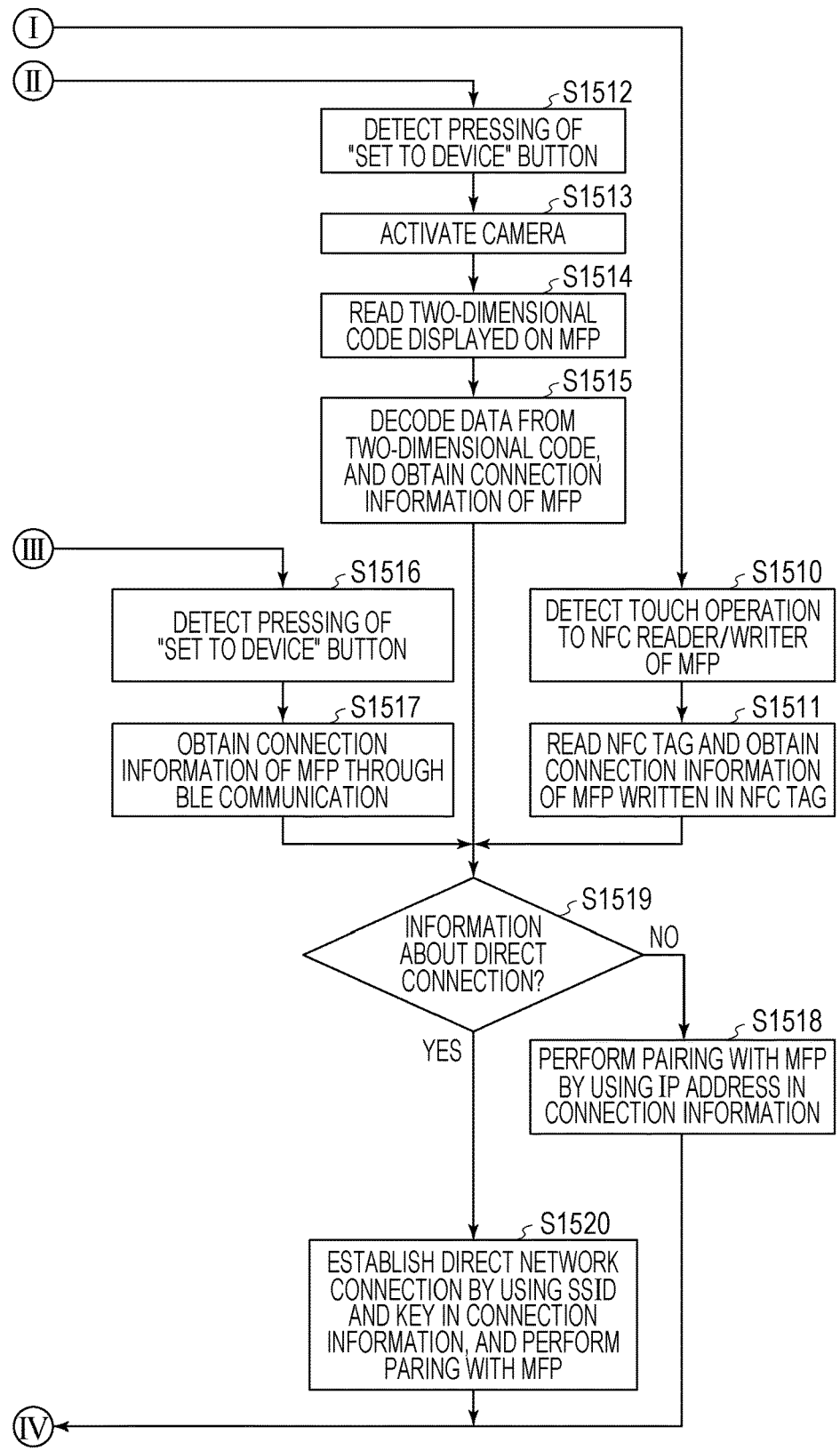

INFORMATION PROCESSING APPARATUS FOR TRANSMITTING DATA USING DESTINATION AND TRANSMISSION SETTING RECEIVED FROM AN EXTERNAL APPARATUS, METHOD FOR CONTROLLING INFORMATION PROCESSING APPARATUS, AND STORAGE MEDIUM

BACKGROUND

Field

The present disclosure relates to a technique for performing collaboration between a multifunction peripheral and a mobile terminal.

Description of the Related Art

A multifunction peripheral (hereinafter referred to as an MFP) including various functions, such as a print function, a scan function, and a fax function, is known. An MFP provided with an e-mail function (hereinafter simply referred to as mail) has become widely available. The mail function enables mail transmission to be performed by attaching, as an attached file, a document image obtained through an operation of reading a document by using a scanner.

In many cases, a user interface (UI) screen of an MFP is small, making its operability somewhat difficult. Therefore, in execution of the mail transmission function, an operation of inputting a new mail destination on the UI screen of an MFP is greatly troublesome for a user. In addition, in an environment in which multiple users share a single MFP in which an address books is prepared, many destinations are registered in the address book of the MFP, and an operation of searching the address book for a destination which a specific user wants to use can be troublesome for the user.

Japanese Patent Laid-Open No. 2005-79800 discloses a technique in which an MFP is provided with a short-range communication function and in which short-range communication is performed between an integrated circuit (IC) tag provided for a different apparatus and the MFP so that information, such as a destination registered in the IC tag, is set to the MFP. However, in the technique described in Japanese Patent Laid-Open No. 2005-79800, information registered in the IC tag is set to an MFP in an overwriting manner. Therefore, information previously set in the MFP is deleted. If the information to be set is a destination for mail transmission performed by the MFP, previously set destinations for mail transmission performed by the MFP are deleted.

An issue can arise that, after destinations registered in the address book of the MFP are set, when a destination is added from the IC tag, the resulting destinations are not destinations for mail transmission which are intended by the user. That is, information that has been set to an MFP is overwritten with information that is to be set from an external apparatus, regardless of the item (setting item) of the information that is to be set to the MFP, which can result in a state in which user-intended settings are not obtained.

SUMMARY

The present invention provides an information processing apparatus including a transmission function of transmitting data. The information processing apparatus includes a memory that stores a set of instructions, and at least one processor that executes at least one of the set of instructions. The set of instructions include receiving data from an external apparatus, the data including at least a destination field and a data field set to be transferred, performing setting by adding a setting included in a field in the received data, to a setting previously set for the transmission function, and transmitting data to a destination, the destination being set as a setting for the transmission function and being set based on a destination included in the destination field in the received data.

Further features will become apparent from the following description of exemplary embodiments with reference to the attached drawings.

BRIEF DESCRIPTION OF THE DRAWINGS

FIG. 12 is a diagram illustrating a pop-up screen displayed on the transmission screen of the MFP just after mail transmission settings transmitted from a mobile terminal are reflected, according to the first embodiment.

FIG. 14 is a diagram illustrating data items which may be received by the MFP according to the first embodiment.

FIGS. 15A and 15B are flowcharts of a process of transmitting data such as a destination, which is performed by the mobile terminal according to the first embodiment.

DESCRIPTION OF THE EMBODIMENTS

Embodiments will be described below with reference to the drawings.

First Embodiment

Figure 1:
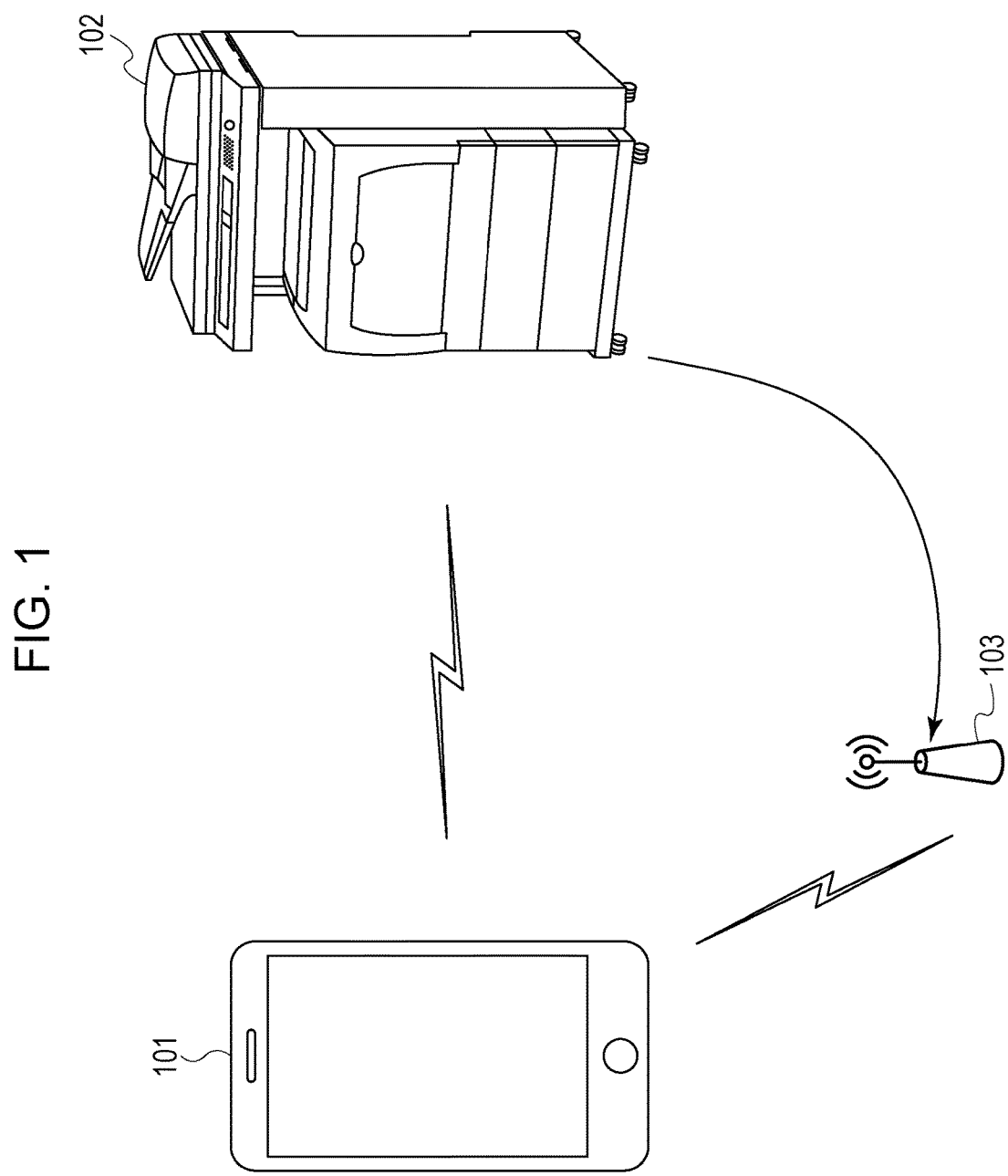
FIG. 1 is a diagram illustrating the configuration of a system according to a first embodiment.

FIG. 1 is a diagram illustrating an exemplary system configuration according to the first embodiment. The system according to the first embodiment will be described by taking, as an example, a configuration including a mobile terminal 101, a multifunction peripheral (MFP) 102, and an access point 103. The mobile terminal 101, the MFP 102, and the access point 103 can communicate with each other through their corresponding Wi-Fi® communication links. The mobile terminal 101 can be any type of mobile device. In addition, while the present configuration makes use of a single MFP 102, multiple MFPs can be included in the configuration.

The mobile terminal 101 can communicate with the MFP 102 in the Wi-Fi® infrastructure mode (hereinafter referred to as the infrastructure mode) in which the access point 103 is used as an intermediary. In addition, the MFP 102 can be operated in the software access point mode, and the MFP 102 can communicate with the mobile terminal 101 through a Wi-Fi® direct connection without using the access point 103.

In the first embodiment, as a precondition, a user operating the mobile terminal 101 is the same as a user operating the MFP 102. That is, the user uses the mobile terminal 101 to make various settings for a mail transmission function of the MFP 102, which are described below. In addition, the user can make various settings for the mail transmission function on the MFP 102 by using an operation panel or the like of the MFP 102.

Figure 2:
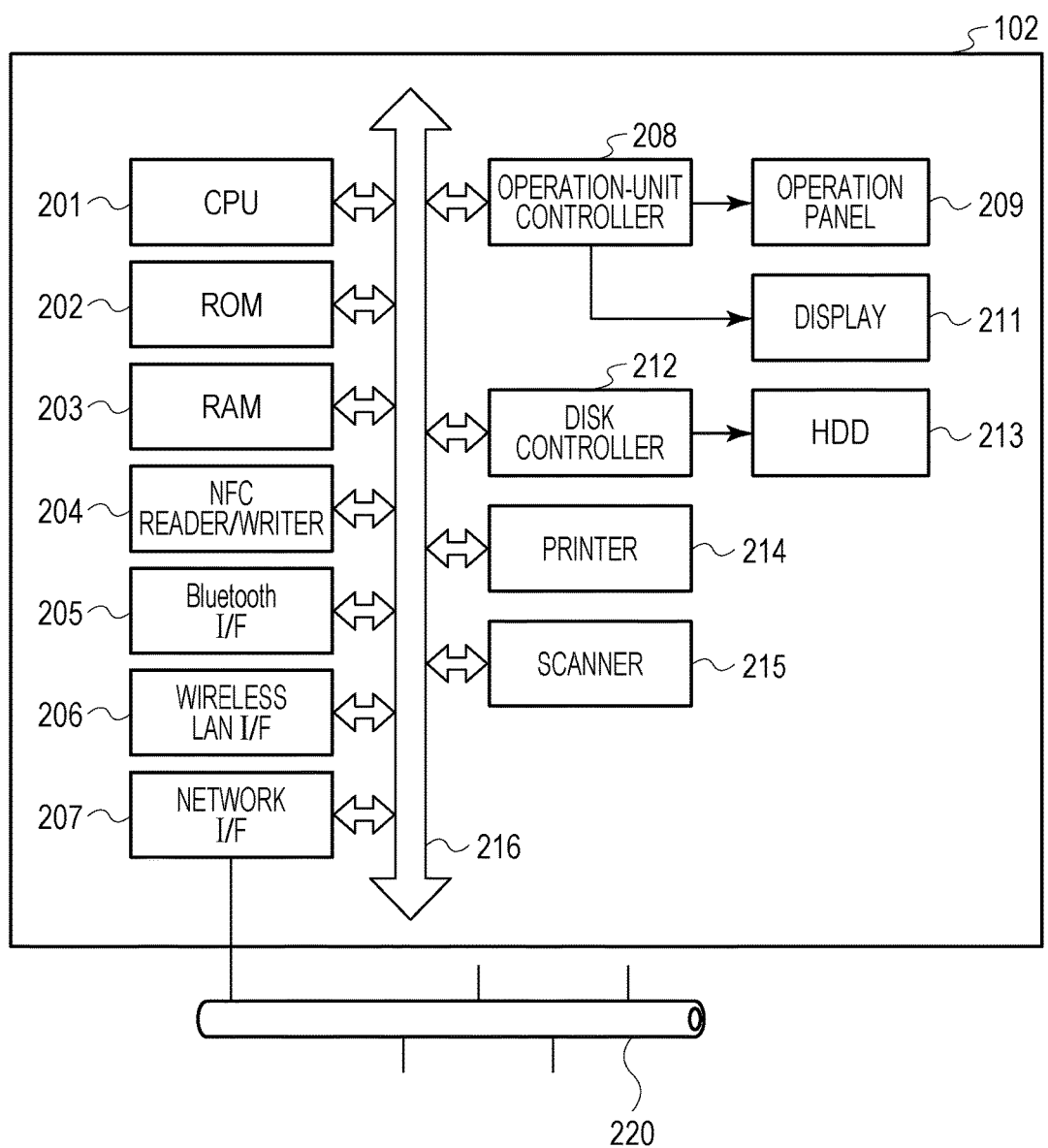
FIG. 2 is a block diagram illustrating the configuration of a multifunction peripheral (MFP) according to the first embodiment.

FIG. 2 illustrates an exemplary internal configuration of the MFP 102 according to the first embodiment. In FIG. 2, the MFP 102 includes a CPU 201 that executes software stored in a read-only memory (ROM) 202 or, for example, a hard disk (HDD) 213. The CPU 201 controls the devices connected to a system bus 216. In some cases, the HDD 213 can be used as a temporary storage area for images.

A random-access memory (RAM) 203 functions as a main memory, a work area, and the like of the CPU 201. An operation-unit controller 208 controls a user interface for various buttons or an operation panel 209, a display 211, and the like provided for the MFP 102. A disk controller 212 controls the HDD 213. A network interface (I/F) 207 receives/transmits data from/to other network equipment, a file server, or the like via a network 220.

The MFP 102 according to the first embodiment uses the single CPU 201 and a single memory (RAM 203) to perform the processes illustrated in the flowcharts described below. However, another configuration can be employed where, for example, multiple CPUs, RAMs, ROMs, and storage devices can collaborate with one another to perform the processes illustrated in the flowcharts described below.

In the first embodiment, a description will be made by taking, as an example, a case in which the MFP 102 is connected to the mobile terminal 101 and the access point 103 through a wireless local-area network (LAN) I/F 206. However, this is not limiting. For example, the MFP 102 can be connected to the access point 103 through the network I/F 207 in a wired manner. That is, a configuration can be employed in which the mobile terminal 101 is connected to the access point 103 in a wireless manner and the access point 103 is connected to the MFP 102 in a wired manner.

When the wireless LAN I/F 206 operates in the infrastructure mode, the wireless LAN I/F 206 is connected to the network 220 via the access point 103, and receives/transmits data from/to other network equipment such as a mobile terminal, a file server, etc. In contrast, when the wireless LAN I/F 206 operates in the software access point mode, the MFP 102 operates as an access point. The MFP 102 operating in the access point mode uses the wireless LAN I/F 206 to establish a direct connection with the mobile terminal 101.

A printer 214 is a print unit that performs printing on a recording medium. The printer can be an electrophotographic type printer, an inkjet type printer, or any other type of printer. A scanner 215 is an image reading unit for reading images located on a recording medium. Most MFPs include an auto document feeder (ADF) (not illustrated) that is mounted as an optional unit on the scanner 215, and enables multiple sheets of recording media to be read automatically.

The MFP 102 can exchange data with various peripherals through a Bluetooth® I/F 205 and a near field communication (NFC) reader/writer 204 for a non-contact integrated circuit (IC) card. The Bluetooth® I/F 205 can use Bluetooth® low energy (Bluetooth® LE) for power-saving communication to receive/transmit data.

Figure 3:
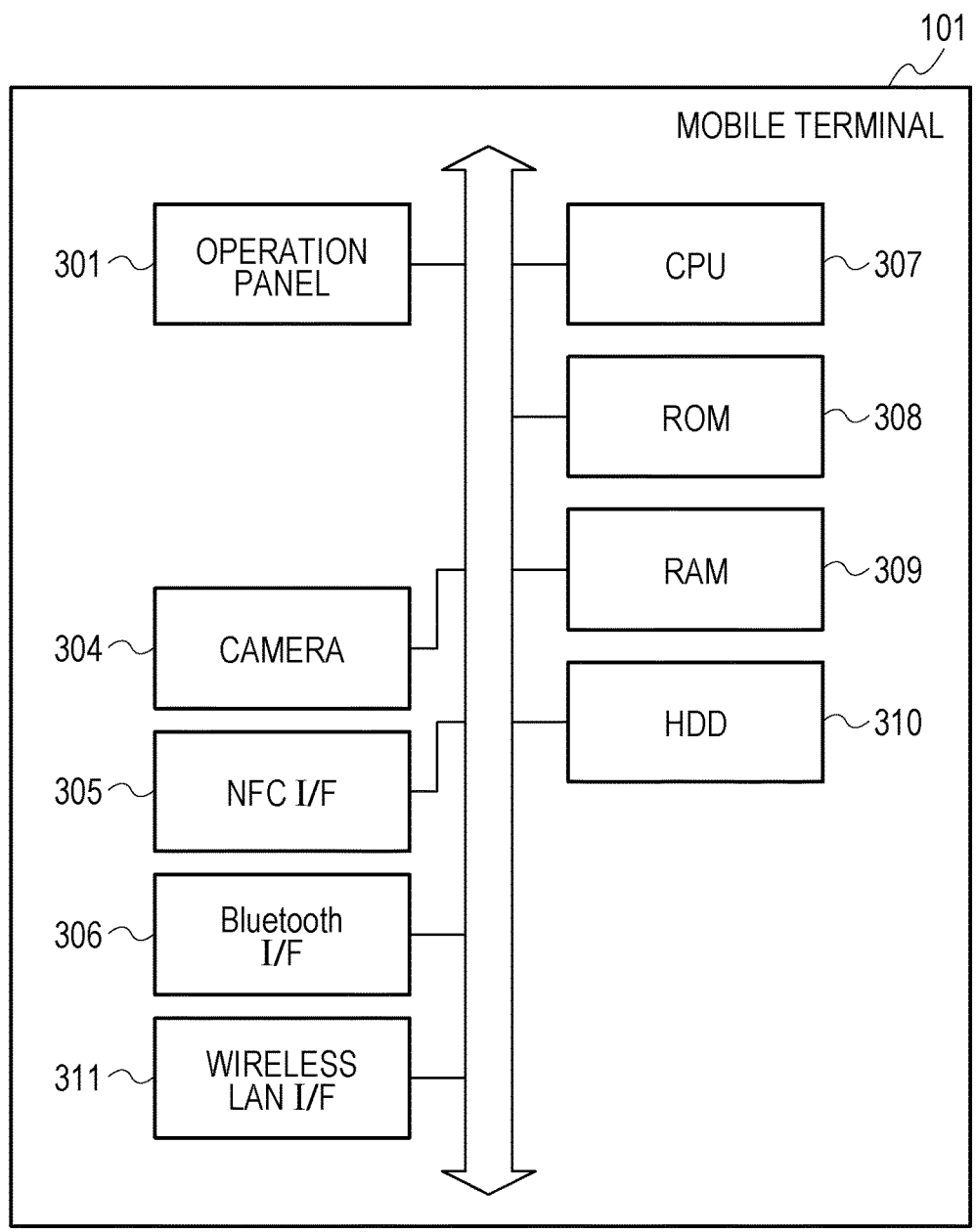
FIG. 3 is a block diagram illustrating the configuration of a mobile terminal according to the first embodiment.

Referring to FIG. 3, the hardware configuration of the mobile terminal 101 will be described. It is assumed that the mobile terminal 101 according to the first embodiment is an apparatus such as a smartphone or a tablet personal computer (PC). However, the mobile terminal 101 can be any apparatus as long as it is an information processing apparatus capable of performing Wi-Fi® communication.

A CPU 307 reads control programs stored in a ROM 308, and performs various processes for controlling the operations of the mobile terminal 101. The ROM 308 is used to store the control programs. A RAM 309 is used as a temporary storage area, such as a main memory and a work area of the CPU 307. An HDD 310 is used to store various data, such as photographs and electronic documents. Instead of an HDD, a solid state drive (SDD) can be used.

An operation panel 301 is provided with a touch panel function with which a touch operation performed by a user can be detected. The operation panel 301 serves as a user interface for displaying various screens provided by an operating system (OS) and a mail transmission application. A user can perform a touch operation on the operation panel 301 so as to input a desired operation instruction in the mobile terminal 101. The mobile terminal 101 can be provided with hardware keys (not illustrated), and the user can use the hardware keys to input an operation instruction in the mobile terminal 101.

A camera 304 is used to capture an image in accordance with an image capture instruction transmitted from a user. The captured images can include photographs, which are stored in a predetermined area of the HDD 310. The mobile terminal 101 can also use the camera 304 to capture a two-dimensional code, which the mobile terminal 101 can analyze using a program to obtain information from the two-dimensional code.

The mobile terminal 101 can exchange data with various peripherals through an NFC I/F 305, a Bluetooth® I/F 306, or a wireless LAN I/F 311. The Bluetooth® I/F 306 of the mobile terminal 101 may receive/transmit data using Bluetooth® low energy.

Referring to FIGS. 4 to 8, screens displayed on the mobile terminal 101 will now be described.

Figure 4:
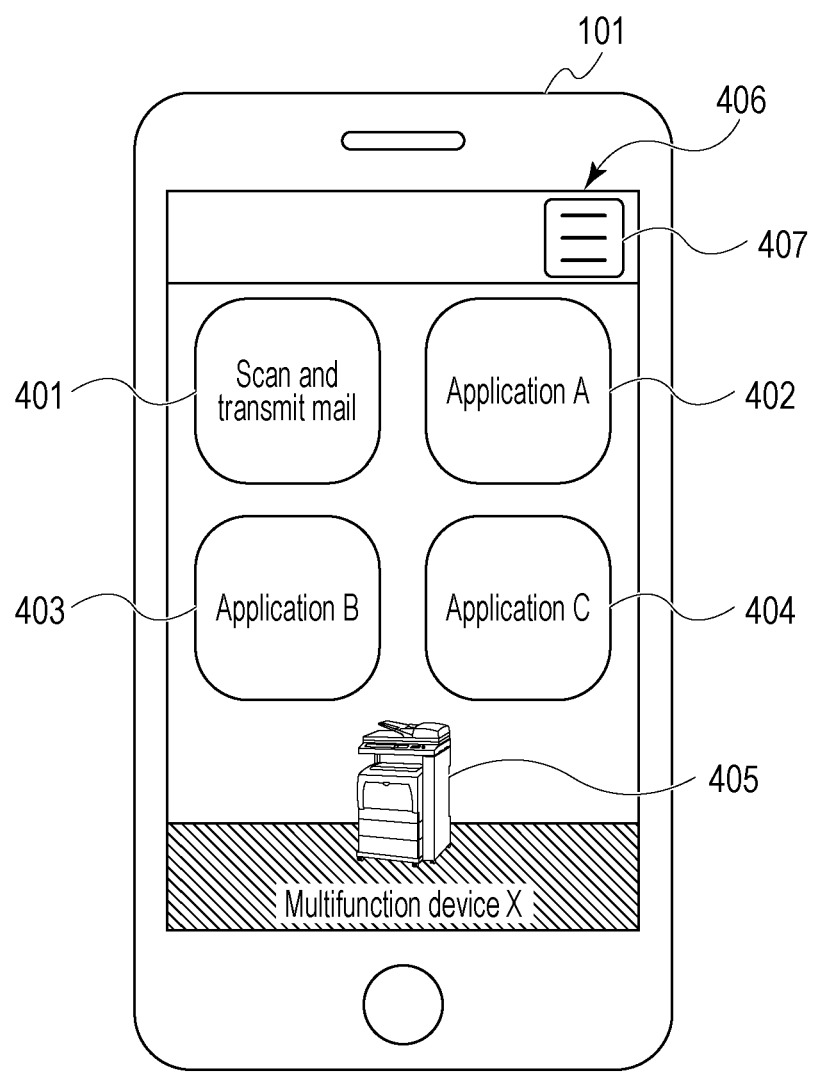
FIG. 4 is a diagram illustrating a mobile application menu screen displayed on the mobile terminal according to the first embodiment.

FIG. 4 illustrates an exemplary menu screen 406 of a mobile application that is displayed on the mobile terminal 101. The mobile application is an application used by the mobile terminal 101 when the mobile terminal 101 collaborates with the MFP 102, and is a software program stored in the ROM 308 or the like. The CPU 307 reads the program of the mobile application into the RAM 309 and executes the program so that the mobile application is activated. A user uses the screen to make settings for the mobile application and/or select a function that is to be used.

The function selection buttons 401, 402, 403, and 404 are UI components with which a user transmits an instruction to start use of the functions provided by the mobile application. A description is provided below using a button as an exemplary UI component. However, the UI component can be any type, such as a pull-down menu, a check box, or text for which links are provided. In the example in FIG. 4, each function is illustrated as "Application".

Each of the functions is a function for collaborating with the MFP 102. The function selection button 401 is a button for selecting a "Scan and transmit mail" application used in a process according to the first embodiment. The "Scan and transmit mail" application is a function of the MFP 102 mailing, as an attached file, data obtained by scanning a document by using the scanner of the MFP 102. In the first embodiment, the "Scan and transmit mail" application in the mobile application can be used to set, in the MFP 102 from the mobile terminal 101, a destination(s) and mail information that are used when the MFP 102 transmits mail.

Hereinafter, an operation in which a user selects a displayed item is expressed as pressing of a button. This expression encompasses a touch operation on a touch panel.

An MFP-list display unit 405 stores information about an MFP with which the mobile application has communicated in the past, and displays an MFP list. When such an MFP is to be used a subsequent time, a user can select the MFP from the MFP-list display unit 405 to specify the MFP 102 with which collaboration is to be performed.

Similarly to the "Scan and transmit mail" application, applications A to C (402 to 404) are applications for collaborating with an MFP displayed in the MFP-list display unit 405. Examples of the applications include an application for transmitting, to the mobile terminal 101, data obtained through scanning.

Figure 5:
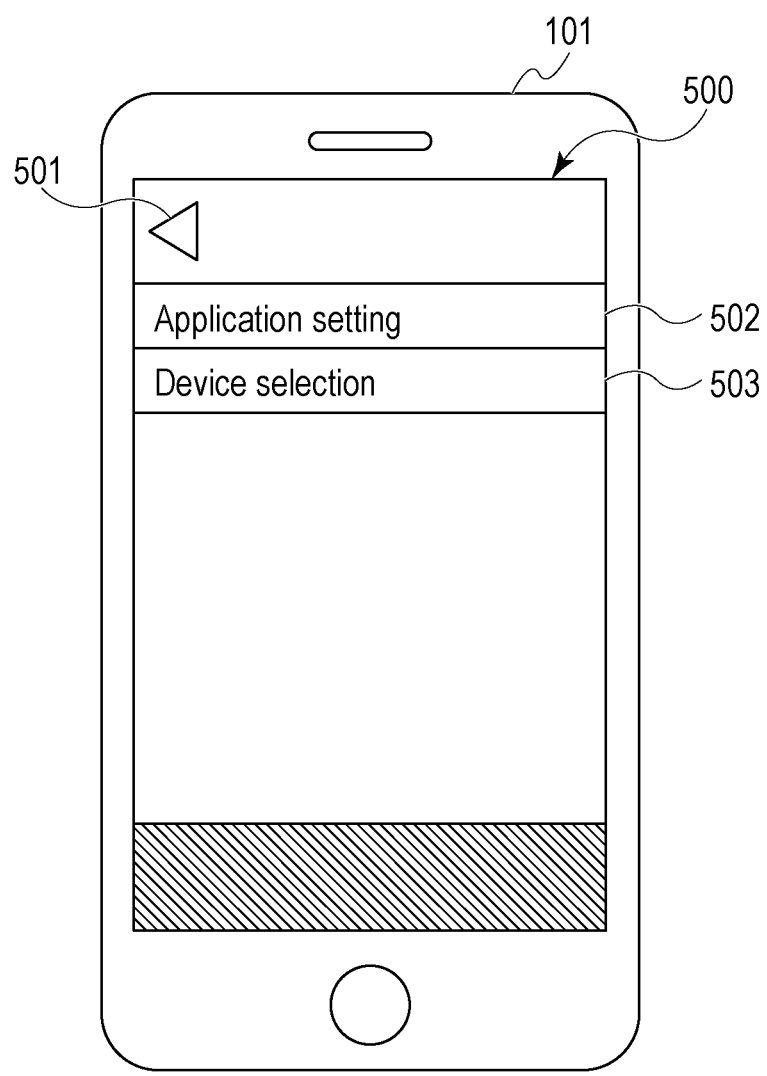
FIG. 5 is a diagram illustrating a mobile application setting screen displayed on the mobile terminal according to the first embodiment.

When a mobile-application setting button 407 is pressed, a mobile application setting screen 500 in FIG. 5 is displayed.

The mobile application setting screen 500 is displayed on the mobile terminal 101. When a BACK button 501 is pressed, the settings for the mobile application are held, and a transition to the mobile application menu screen 406 illustrated in FIG. 4 is performed.

When an APPLICATION SETTING button 502 is pressed, a setting-item list for the mobile application is displayed (not illustrated). Examples of a setting item for the mobile application include, but are not limited to, registration of settings of user authentication information of the MFP 102 and setting of the communication mode illustrated in FIG. 7.

Figure 6:
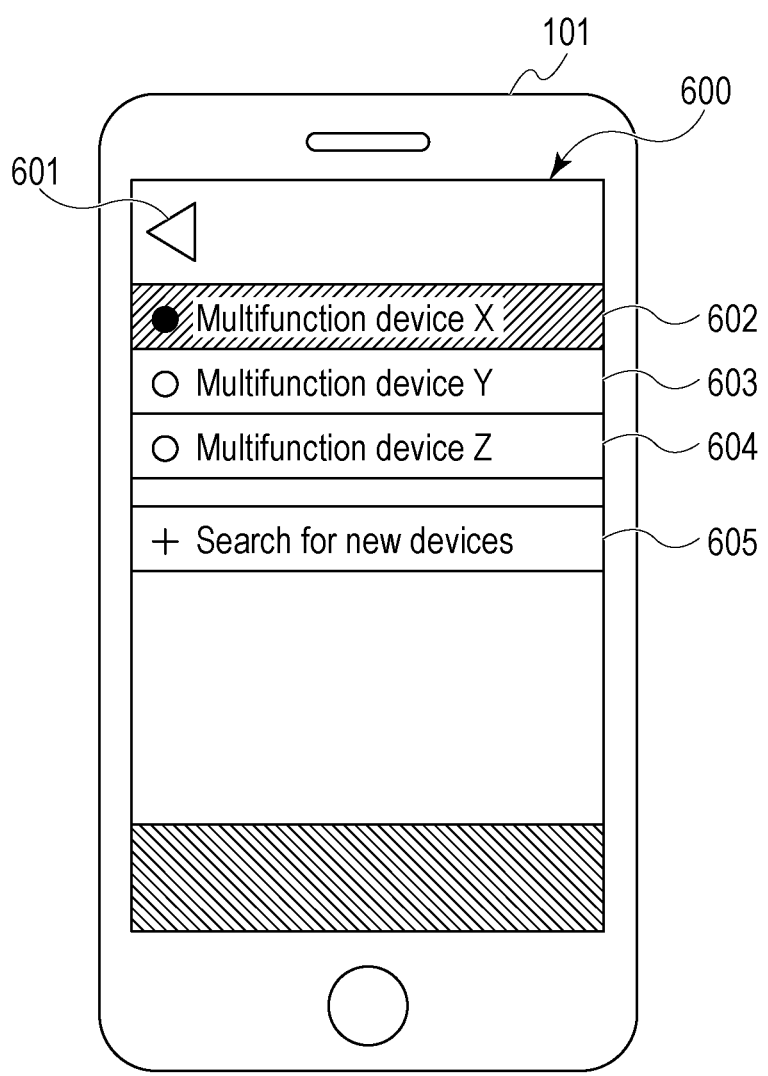
FIG. 6 is a diagram illustrating a screen that is used to select an MFP which is to be a communication target and that is displayed on the mobile terminal according to the first embodiment.

When a DEVICE SELECTION button 503 is pressed, a transition to a device selection screen 600 illustrated in FIG. 6 is performed. The device selection screen 600 is used to select, on the mobile terminal 101, an MFP that is to be a communication target. Upon transition to the device selection screen 600, the mobile terminal 101 searches for MFPs connected to the network that the mobile terminal 101 is connected to, and displays a list of the discovered MFPs.

When each of MFP selection buttons 602, 603, and 604 is pressed, connection information, such as the IP address and the MAC address, of the MFP corresponding to the selected button is stored. The MFPs for which information is stored in this operation are ready to be selected in the MFP-list display unit 405.

When a SEARCH FOR NEW DEVICES button 605 is pressed, the mobile terminal 101 searches again for MFPs on the network the mobile terminal 101 is connected to, and updates the list of MFPs displayed on the screen. In addition, the mobile terminal 101 can enable the user to input the IP address of a specific MFP the user wants to connect to, so the specific MFP is included in the search (not illustrated). When a BACK button 601 is pressed, a transition to the mobile application setting screen 500 illustrated in FIG. 5 is performed.

Figure 7:
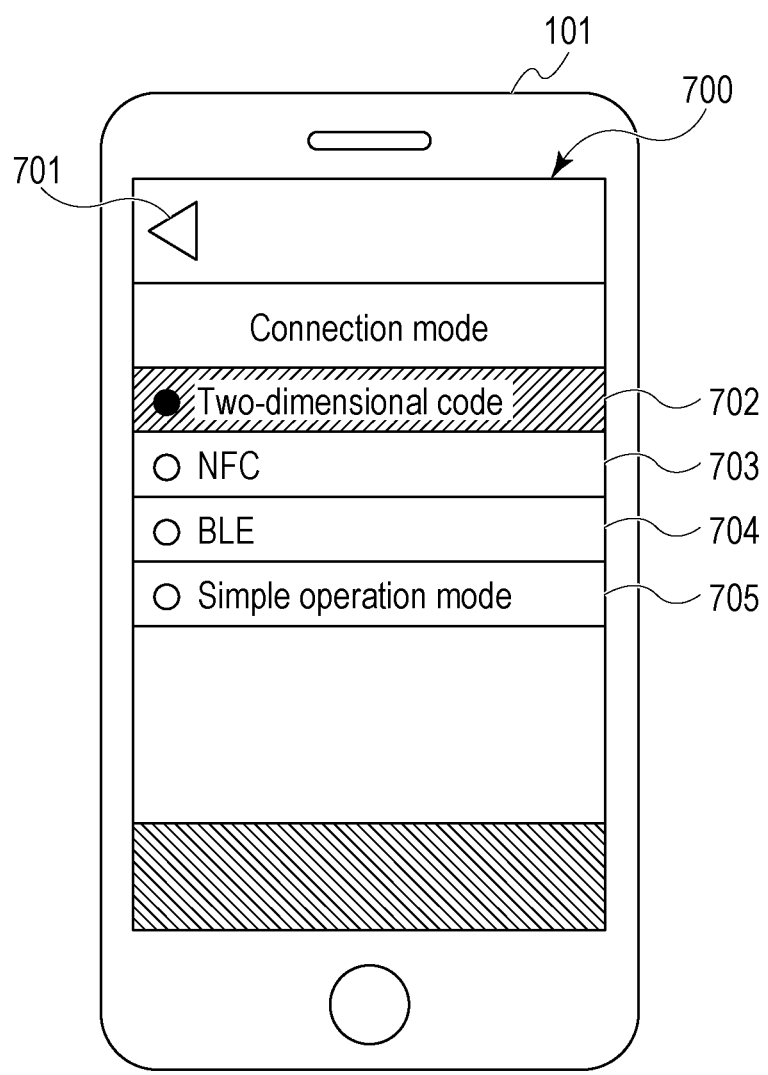
FIG. 7 is a diagram illustrating a screen that is used to set a connection mode in which a connection to an MFP is established and that is displayed on the mobile terminal according to the first embodiment.

FIG. 7 illustrates a connection-mode setting screen 700 for making, on the mobile terminal 101, a setting indicating which type of connection mode is to be used for the selected MFP. The connection mode is a mode for specifying which method is used for the mobile terminal 101 to obtain, from an MFP, information necessary for wireless communication when a wireless communication connection is to be established between the mobile terminal 101 and the MFP.

The user presses the APPLICATION SETTING button 502 illustrated in FIG. 5, and selects a connection-mode setting item from the setting-item list for the mobile application. Thus, the user is presented with the connection-mode setting screen 700 illustrated in FIG. 7.

The mobile terminal 101 performs Wi-Fi® communication with the MFP 102 to transmit transmission setting information indicating mail transmission settings, such as a destination. The mobile terminal 101 establishes a wireless connection using Wi-Fi® communication with the MFP 102. Hereinafter, an operation in which the mobile terminal 101 specifies the MFP 102 as the communication target, on a wireless network and in which the mobile terminal 101 establishes a connection with the MFP 102 is called pairing. To perform pairing, the mobile terminal 101 may need to obtain Wi-Fi® connection information from the MFP 102.

In the case of Wi-Fi® direct connection, the a network name, i.e., service set identifier (SSID), which the MFP 102 uses to operate as a software access point is necessary as Wi-Fi® connection information (hereinafter referred to as connection information). In addition, information about a password (KEY) for establishing a connection with the network specified by the SSID is necessary. In the case of infrastructure mode connection, since the mobile terminal 101 and the MFP 102 are connected to the network provided by the same access point, the IP address of the MFP 102 is necessary. The MAC address can be used to specify the MFP 102.

There are multiple methods in which the mobile terminal 101 obtains, from the MFP 102, connection information necessary when such pairing is to be performed. That is, there are multiple methods for performing pairing between the mobile terminal 101 and the MFP 102. Herein, these are called connection modes. The mobile terminal 101 sets the connection mode used when pairing with the MFP 102 is performed from the predetermined connection modes displayed on the connection-mode setting screen 700 in FIG. 7. When multiple MFPs registered in the mobile terminal 101 are present, the connection mode that is set in this operation is a connection mode commonly used in processes performed on all of the MFPs.

In the first embodiment, there are four types of connection modes. One is a two-dimensional code mode in which the mobile terminal 101 establishes a connection by obtaining connection information from a two-dimensional code displayed on the operation panel 209 of an MFP 102. A second is an NFC mode in which the mobile terminal 101 obtains connection information through NFC communication by the NFC I/F 305 of the mobile terminal 101 being brought into contact with the NFC reader/writer 204 of the MFP 102. A third is the Bluetooth® low energy mode in which the mobile terminal 101 obtains connection information by performing Bluetooth® low energy communication with the Bluetooth® I/F 205 of the MFP 102. A fourth is the simple operation mode in which, in the case where mobile terminal 101 has established a Wi-Fi connection and where the MFP 102 with which the connection has been established is selected from the MFP-list display unit 405, data such as a destination is transmitted through the connection. The simple operation mode is a mode in which, without an operation on a two-dimensional code or the like, data such as a destination is transmitted to the MFP 102 with which pairing has been performed.

In establishment of a connection with an MFP that has not been registered in the mobile terminal 101, the two-dimensional code mode, the NFC mode, and the Bluetooth® low energy mode cause a manual input of the SSID and KEY or the IP address not to be needed, achieving easy establishment of a connection. Even when an MFP is previously registered in the mobile terminal 101, a setting can be made so that the SSID and KEY, which are used for the MFP to establish a Wi-Fi direct connection, are randomly changed every time. When such an MFP is used, these connection modes are useful because a manual input of the SSID and KEY is unnecessary.

In the case where multiple MFPs are registered in the mobile terminal 101 and where they are of the same model, distinctions may not be able to be made when the user just views the icons in the MFP-list display unit 405. Even in this case, the user goes to the MFP with which the user wants to establish a connection, and performs a connection process by using the two-dimensional code mode, the NFC mode, or the Bluetooth® low energy mode. Then, pairing is automatically performed with the MFP, thus avoiding an erroneous selection of an MFP as the data transmission target.

In contrast, in the case where a user has only one MFP that is to be used, operations performed on a two-dimensional code or the like every time can be troublesome. Therefore, in this case, it can be more efficient to select the simple operation mode, in which these operations are unnecessary.

A setting switch 702 for reading a two-dimensional code that is illustrated in FIG. 7 can be used to set the connection mode to the two-dimensional code mode in which a two-dimensional code is read. A setting switch 703 for NFC can be used to set the connection mode to the NFC mode. A setting switch 704 for Bluetooth® low energy can be used to set the connection mode to the Bluetooth® low energy mode. A setting switch 705 for the simple operation mode can be used to set the connection mode to the simple operation mode. When a BACK button 701 is pressed, the selected connection mode is held, and a transition to the mobile application setting screen 500 is performed.

Figure 8:
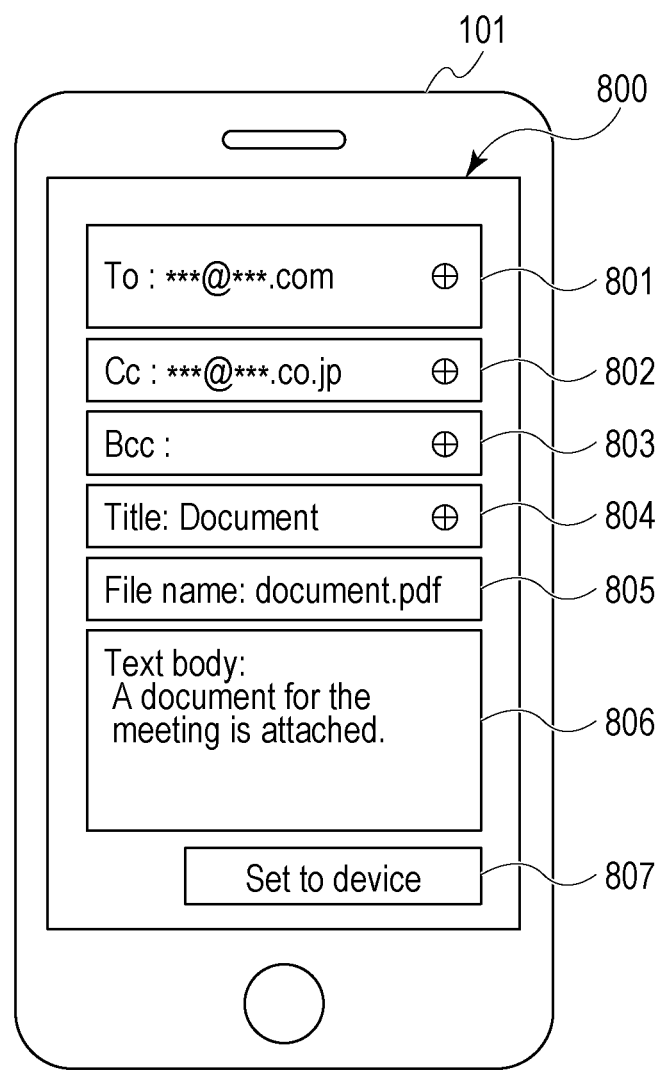
FIG. 8 is a diagram illustrating a screen on which mail transmission settings are set and which is displayed on the mobile terminal according to the first embodiment.

FIG. 8 illustrates a mail-transmission setting screen 800 displayed on the mobile terminal 101. The mail-transmission setting screen 800 is displayed on the mobile terminal 101 after the function selection button 401 of "Scan and transmit mail" in FIG. 4 is pressed.

The user can use the screen to input data used in the mail transmission process performed in the MFP selected as a processing target in the MFP-list display unit 405. In many cases, the UI screen of the selected MFP is small, and the operability is less than that of a mobile terminal. In addition, an MFP can often be shared by multiple users. Therefore, an inconvenient situation can occur where, in the case where a mail text body or the like is input on the UI screen of an MFP, a single user occupies the MFP for a long time. To address this issue, the user inputs, on the mobile terminal 101, information that needs to be set in a mail transmission process performed in the MFP. The mobile terminal 101 transmits, to the MFP, the information input by the user.

The user can select a destination in an address book stored in the mobile terminal 101, and can input the selected destination to a mail address field (To) 801 in FIG. 8. The selected destination in this field is specified as a "To" destination. Multiple destinations can be specified at the same time.

The user can select a destination in the address book stored in the mobile terminal 101, and can input the selected destination to a mail address field (Cc) 802. The selected destination in this field is specified as a "Cc" destination. Multiple destinations can be specified at the same time.

The user can select a destination in the address book stored in the mobile terminal 101, and can input the selected destination to a mail address field (Bcc) 803. The selected destination in this field is specified as a "Bcc" destination. Multiple destinations can be specified at the same time.

A new destination can be input and specified, using a software keyboard of the mobile terminal 101, to the mail address field (To) 801, the mail address field (Cc) 802, or the mail address field (Bcc) 803.

A title field 804 is a field to which a mail title is input. A text field 806 is a field to which a mail text body is input. A file name field 805 is a field to which the name of an attached file of the mail is input. In the first embodiment, a file name used when data obtained through scanning in the MFP 102 is attached as an attached file is input to the file name field 805. The user can input a string, using the soft keyboard, to the title field 804, the text field 806, or the file name field 805.

Data can be input to each field by using not only the software keyboard, but also another input system. For example, voice recognition can be used to input a string through voice.

In addition to the items illustrated in FIG. 8, scan settings used when the MFP 102 scans a document, such as a resolution and a color mode, can be set on the mobile terminal 101.

When a SET TO DEVICE button 807 is pressed, a process for transmitting, to the MFP 102, data such as a destination that is input on the mail-transmission setting screen 800 is performed. If the connection mode is set to the simple operation mode, transmission of data, such as a destination, to the selected MFP 102 is started at once.

If the connection mode is not set to the simple operation mode, a process for establishing a Wi-Fi® connection with the MFP 102 in accordance with the mode specified as the connection mode is started. For example, if the connection mode is set to the two-dimensional code mode, the mobile terminal 101 activates the camera 304 to read a two-dimensional code displayed on the MFP 102. Then, the mobile terminal 101 reads the two-dimensional code on the MFP 102, analyzes the read code, and obtains connection information, i.e., the SSID and KEY if the connection is to be a direct connection and the IP address if the connection is to be an infrastructure connection, necessary for the Wi-Fi® connection.

The mobile terminal 101 then establishes a Wi-Fi® connection and performs pairing with the target MFP 102. The mobile terminal 101 transmits data, such as a destination that is set on the screen in FIG. 8, to the MFP 102, with which pairing has been performed and which is the transmission target. In the case where the connection mode is set to the Bluetooth® low energy mode or the NFC mode, communication according to the connection mode is also performed with the MFP 102, and establishment of a Wi-Fi® connection and pairing is performed. In the case where the connection mode indicates NFC communication, instead of pressing the "Set to device" button 807, the mobile terminal 101 can be brought in proximity to the NFC reader/writer 204 of the MFP 102. Thus, establishment of a Wi-Fi® connection and pairing can be performed, and data, such as a destination, can be transmitted.

When data transmission to the MFP 102 is completed, all of the inputs on the mail-transmission setting screen 800 are cleared, and the screen is returned back to the mobile application menu screen 406 in FIG. 4. If the data transmission fails, an error is displayed, and the inputs on the mail-transmission setting screen 800 are not cleared and are still displayed.

Thus, in the first embodiment, when input of data used in mail transmission is completed, the mobile terminal 101 starts a process of transmitting the input settings to the MFP 102. That is, when the user performs an operation of transmitting settings that have been input, the mobile terminal 101 that needs to perform pairing with the MFP 102 automatically starts a process necessary in the pairing with the MFP 102.

Information that has been previously set to the MFP 102 from the mobile terminal 101 can be set again by using the mobile terminal 101. For example, the mail-transmission setting screen 800 can be displayed again, and the user can select items to which the user wants to input data again and may input data to the selected items. That is, after the mobile terminal 101 transmits, to the MFP 102, mail-transmission setting information indicating mail transmission settings, the mobile terminal 101 can again transmit mail transmission settings to the MFP 102. At that time, for the setting item for destination, when a destination(s) previously set in the MFP 102 is present, the MFP 102 adds a destination(s) transmitted from the mobile terminal 101 to the existing destination(s). In contrast, for other setting items, e.g., the text body item, when an item to which data has been set is present, the MFP 102 overwrites the item.

For example, when a destination(s) is to be added, the user may input only the destination(s) that is to be added in an input operation performed again by using the mobile terminal 101. The user can input data again including data that has previously been input. In this case, the MFP 102 can exclude the duplicate data. Alternatively, the MFP 102 can temporarily set data, including the duplicate data, and the user who views the screen on the MFP 102 can then delete the data.

The user may want to modify the mail text body or the attached file name that have been prepared. In this case, the MFP 102 overwrites the item that has been set.

Screens displayed on the operation panel 209 of the MFP 102 will be described with reference to FIGS. 9 to 12.

Figure 9:
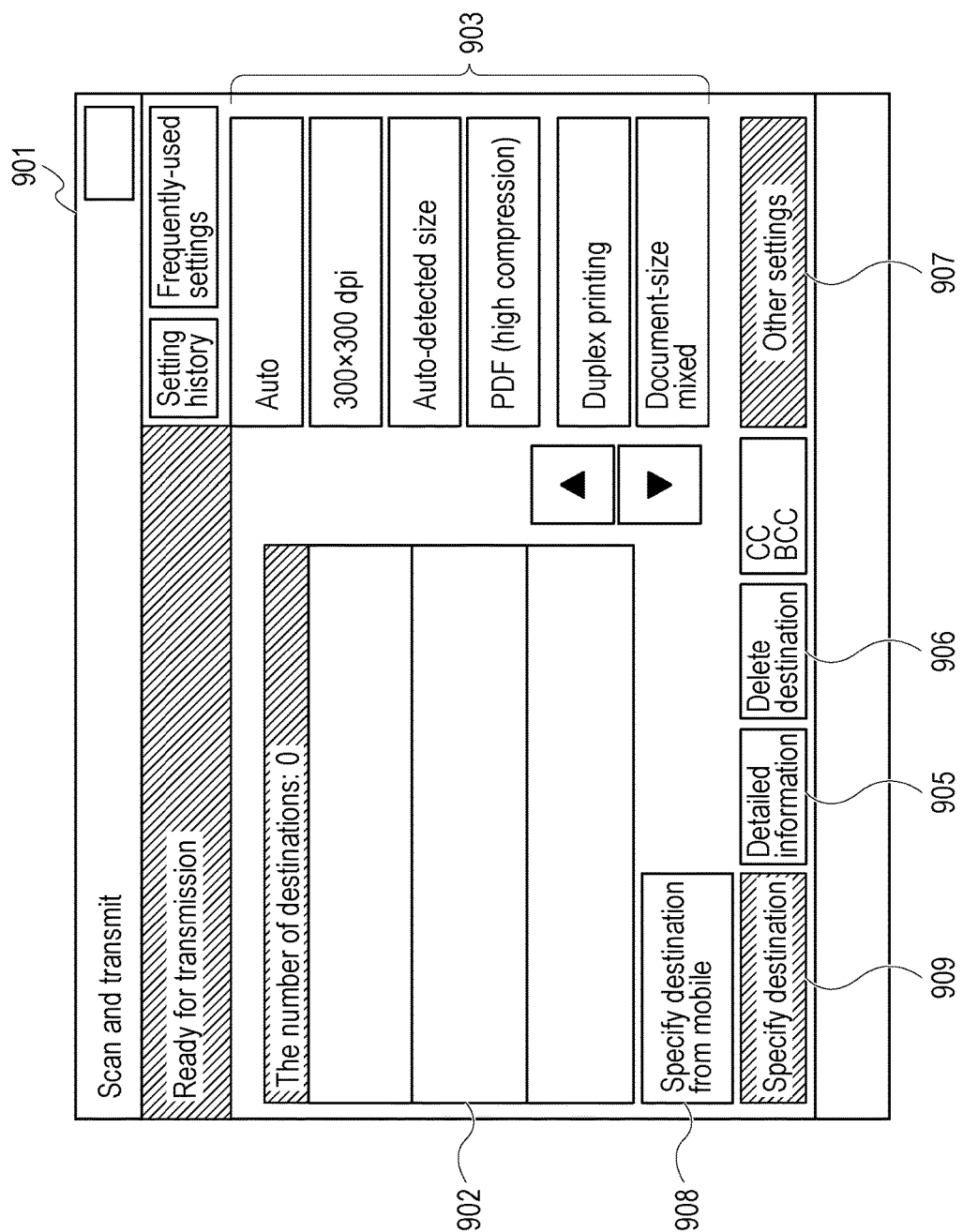
FIG. 9 is a diagram illustrating a transmission screen displayed on an MFP according to the first embodiment.

FIG. 9 is a diagram illustrating an exemplary screen 901 displayed when a "Scan and transmit" function of the MFP 102 is selected on the UI screen or the like of the MFP 102. The screen 901 is a screen in which setting of a transmission destination(s) and setting for scanning are performed on the MFP 102.

In a destination list 902, destinations that are set as data transmission targets are displayed as a list. Destination information can include a mail address, a FAX number, and the address of a file server. In the first embodiment, mail addresses are illustrated as an example of destinations that have been set. The destination list 902 illustrated in FIG. 9 indicates a state in which no transmission targets have been set.

In the first embodiment, information including a mail address(es) can be received from the mobile terminal 101, and can be set as a data transmission target(s). A destination(s) can be set through the UI screen of the MFP 102.

Figure 10:
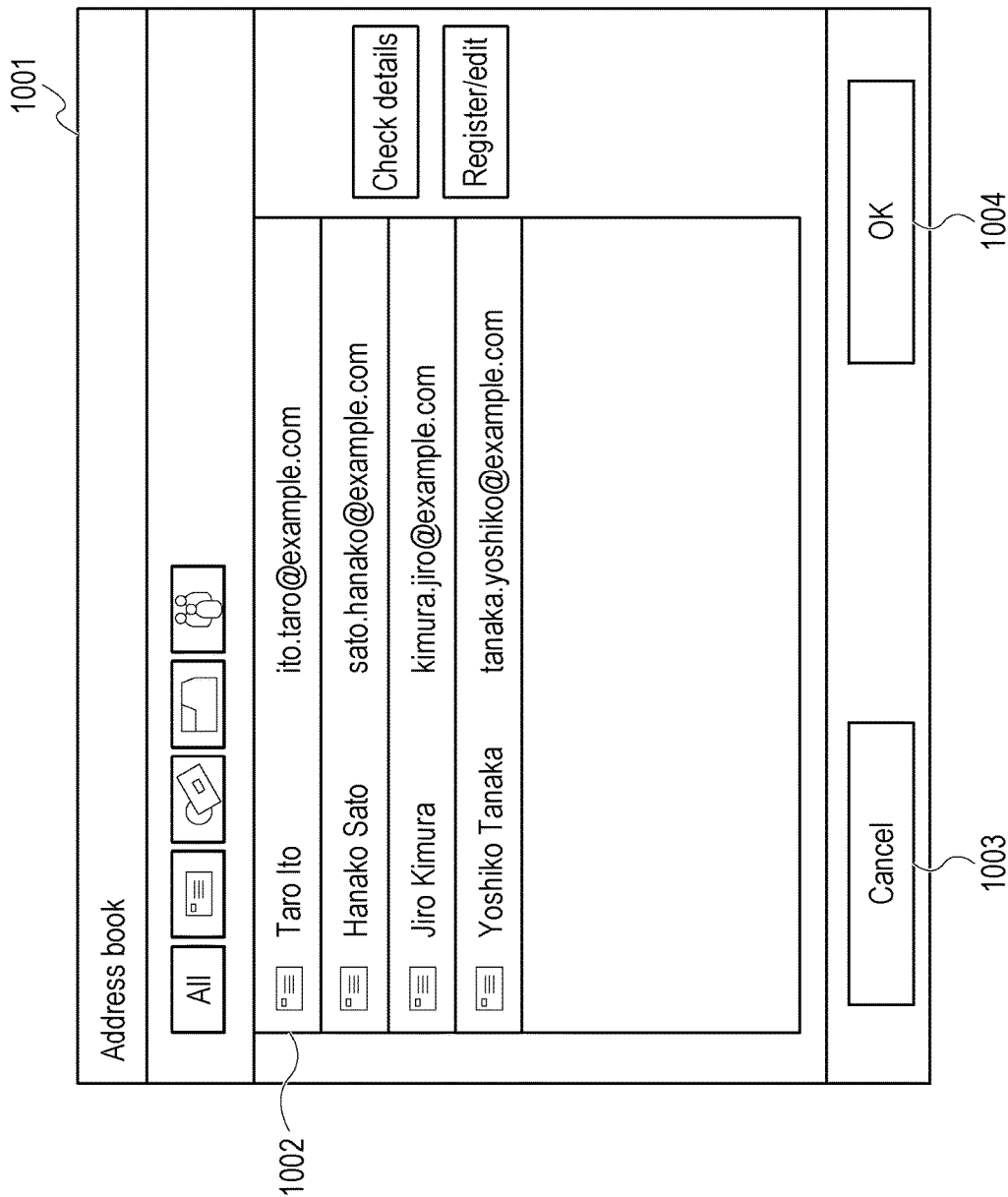
FIG. 10 is a diagram illustrating an address book screen of the MFP according to the first embodiment.

When a SPECIFY DESTINATION button 909 is pressed, a transition to an address book screen 1001 illustrated in FIG. 10 is performed. The user can then select a desired destination(s) from the destinations registered in an address book of the MFP 102, and can add the selected destination(s) to the destination list 902.

FIG. 10 illustrates a screen displaying the address book. On the address book screen 1001, destination display fields 1002 for illustrating destinations registered in the address book of the MFP 102 are present. The user can select one or more destinations on the UI screen of the MFP 102. When an OK button 1004 is pressed, the address book screen 1001 is closed, and the destination(s) selected in the destination display fields 1002 is set to the destination list 902 on the transmission screen 901.

When a CANCEL button 1003 is pressed, the address book screen 1001 is closed, and the destination list 902 on the transmission screen 901 is not updated. In the case where a destination(s) has previously been set in the destination list 902 in FIG. 9, when a destination(s) is selected from the address book in FIG. 10, the selected destination(s) is added to the destination(s) previously set.

Returning back to FIG. 9, a description will be continued. Scan setting buttons 903 are used when scan settings are changed.

A DETAILED INFORMATION button 905 is used when detailed information about a destination is to be displayed. When the DETAILED INFORMATION button 905 is pressed, a transition to a screen on which the detailed information about the selected destination is displayed is performed.

A DELETE DESTINATION button 906 is used when the selected destination(s) is to be deleted. When the DELETE DESTINATION button 906 is pressed, the selected destination(s) can be deleted. When an OTHER SETTINGS button 907 is pressed, a screen (not illustrated) of a menu list for changing information for transmission is displayed. For example, the information, such as a title and a text body, which is set on the mobile terminal 101 as illustrated in FIG. 8 can be set on an operation screen of the MFP 102 by pressing the OTHER SETTINGS button 907.

Figure 11A:
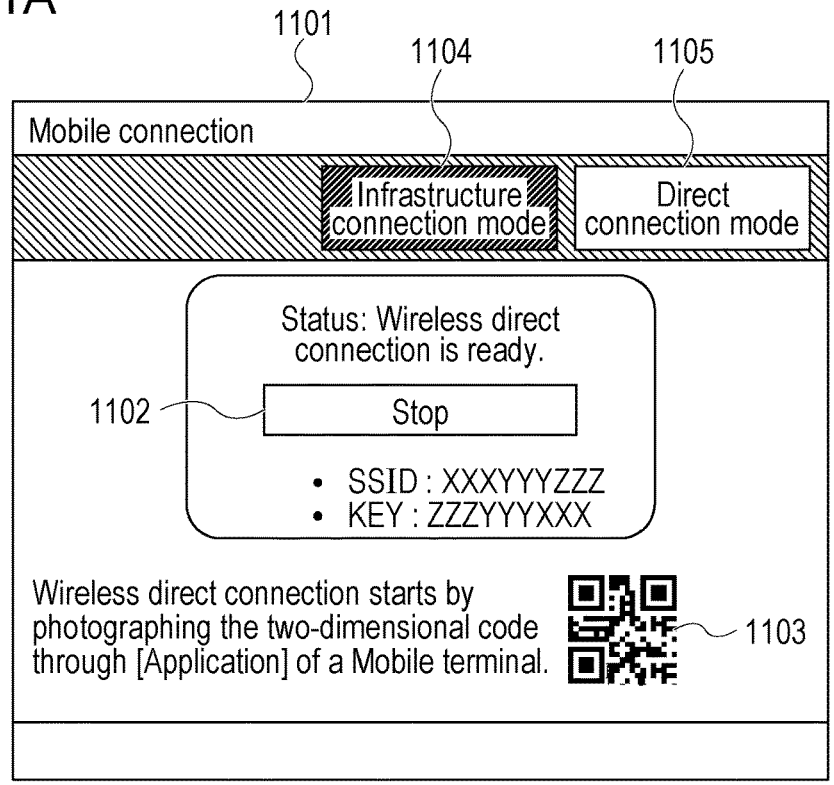
FIGS. 11A and 11B are diagrams illustrating screens which are used to display information about a Wi-Fi connection and which are displayed on the MFP according to the first embodiment.
Figure 11B:
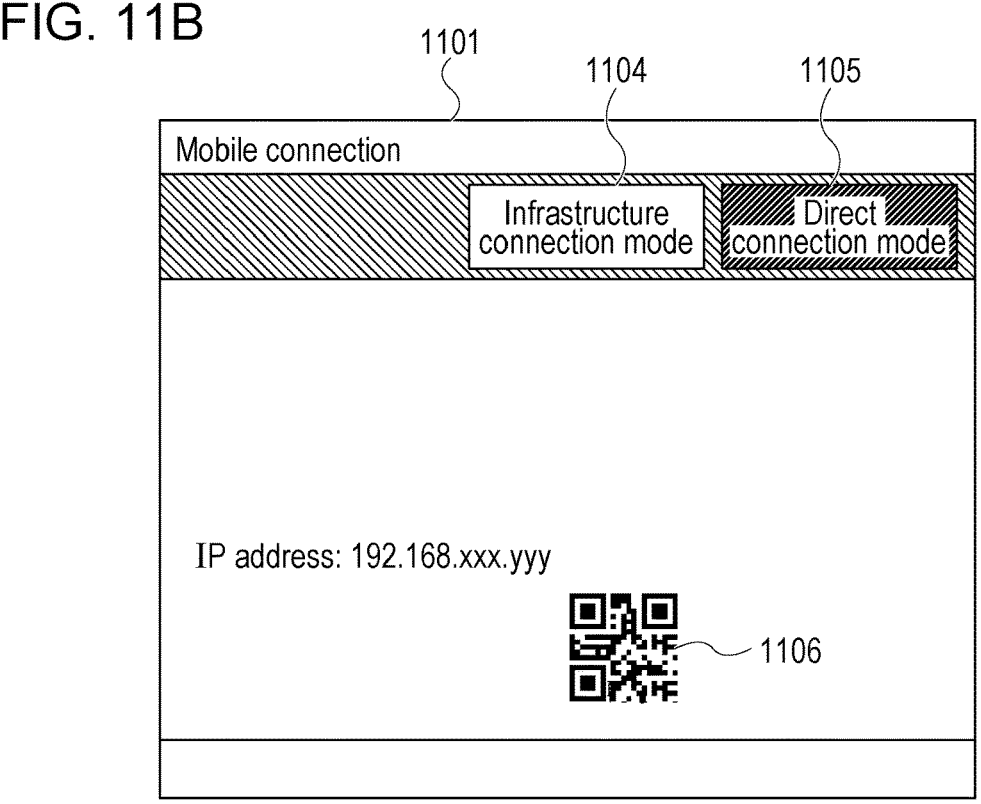

When a SPECIFY DESTINATION FROM MOBILE button 908 is pressed, a transition to a mobile connection screen illustrated in FIG. 11A or 11B is performed. When the simple operation mode of the mobile terminal 101 is ON, it is not necessary to establish a new pairing with the mobile terminal 101. Therefore, the user does not need to press the SPECIFY DESTINATION FROM MOBILE button 908. When the SPECIFY DESTINATION FROM MOBILE button 908 is pressed, the MFP 102 provides information necessary for pairing with the mobile terminal 101 by using various methods, or prepares provision of the information. After that, the MFP 102 receives data about transmission settings from the mobile terminal 101 with which a pairing has been established. The MFP 102 overwrites transmission setting items that have been currently set or adds data to transmission setting items in accordance with the received transmission setting items.

FIGS. 11A and 11B illustrate a mobile connection screen 1101 that is a portal screen for establishing a Wi-Fi® connection between the MFP 102 and the mobile terminal 101. The mobile connection screen 1101 is a screen displayed on the display 211 of the MFP 102.

The mobile connection screen 1101 contains an INFRASTRUCTURE CONNECTION MODE button 1104 and a DIRECT CONNECTION MODE button 1105. Pressing of the buttons can cause switching between information display for establishing a connection with the mobile terminal 101 in the Wi-Fi® infrastructure mode and information display for establishing a connection with the mobile terminal 101 in the Wi-Fi® direct mode.

Information about which screen, the screen displayed when the button 1104 is pressed or the screen displayed when the button 1105 is pressed, is to be displayed by default is set in the MFP 102. The mobile connection screen 1101 is first displayed with one of the modes being selected. After that, when the user presses the INFRASTRUCTURE CONNECTION MODE button 1104 or the DIRECT CONNECTION MODE button 1105 as necessary, information in the corresponding connection mode is displayed.

FIG. 11A illustrates a display produced when the user presses the DIRECT CONNECTION MODE button 1105, or when the direct connection mode is selected as the default mode. When a direct-communication operation button 1102 is pressed, direct communication can be started or stopped. FIG. 11A illustrates a state in which Wi-Fi® direct communication has been started. In the state illustrated in FIG. 11A, when the direct-communication operation button 1102 is pressed, the Wi-Fi® direct communication is stopped.

When direct communication is to be started, connection information necessary for direct communication is displayed on the screen and a two-dimensional code 1103 in which the connection information is embedded is also displayed. Examples of the connection information necessary for direct communication include the SSID and KEY described above. However, these are not limiting. When the direct communication is stopped, the information and the two-dimensional code are not displayed. That is, in the example in FIG. 11A, when direct communication has not started (has been stopped), "Start" instead of "Stop" is displayed on the direct-communication operation button 1102. In addition, information such as the SSID and KEY and the two-dimensional code 1103 are not displayed. When direct communication has not started, the MFP 102 does not output radio waves used in direct communication, that is, does not output radio waves in the software access point mode.

When the user presses the direct-communication operation button 1102 and instructs the MFP 102 to start direct communication, the MFP 102 supplies radio waves used in direct communication. The MFP 102 supplies radio waves, and displays information necessary for pairing in direct communication as illustrated in FIG. 11A.

At that time, the MFP 102 supplies information necessary for pairing in all of the connection modes compatible with the MFP 102. For example, in the case where the MFP 102 is compatible with the two-dimensional code mode as a connection mode in which the MFP 102 is connected to the mobile terminal 101, a two-dimensional code containing information necessary for pairing is displayed as illustrated in FIG. 11A. In addition, the MFP 102 activates the NFC reader/writer 204, writes necessary information in the NFC tag included in the NFC reader/writer 204 of the MFP 102, and waits for the mobile terminal 101 to be brought into proximity to the mobile terminal 101.

The MFP 102 also activates Bluetooth® low energy, and waits for Bluetooth® low energy communication with the mobile terminal 101. In the case of Bluetooth® low energy, a configuration can be employed in which the user pressing a Bluetooth® low energy activation button (not illustrated) causes Bluetooth® low energy radio waves to be output.

FIG. 11B illustrates a display produced when the INFRASTRUCTURE-CONNECTION MODE button 1104 is pressed or when the infrastructure connection mode is set as a default mode. On this screen, information for establishing a Wi-Fi® infrastructure connection between the mobile terminal 101 and the MFP 102 via the access point 103 is displayed, and a two-dimensional code 1106 in which the information is embedded is also displayed. The information necessary for establishing a Wi-Fi® infrastructure connection is, for example, the IP address of the MFP 102. However, this is not limiting. As a precondition, the mobile terminal 101 and the MFP 102 are connected to the same network of the access point 103. One of operation forms in the infrastructure connection mode is such that multiple MFPs 102 are connected to one another in the same network of the access point 103. In this case, the mobile terminal 101 uses the IP address to specify an MFP with which pairing is to be performed.

The mobile terminal 101 reads a two-dimensional code so as to obtain the SSID and KEY automatically if it operates in the direct connection mode. The mobile terminal 101 uses the obtained SSID and KEY to switch the current wireless communication to communication in a direct connection network or to establish a wireless connection in a direct connection network. Then, the mobile terminal 101 performs pairing with the MFP 102. Thus, the mobile terminal 101 can perform wireless communication with the MFP 102. In the case of the infrastructure connection mode, the mobile terminal 101 can automatically obtain the IP address of the MFP 102, and can perform pairing with the MFP 102 in the current wireless communication environment, so that the connection target is determined.

When the NFC reader/writer 204 of the MFP 102 is ready to be used, the NFC reader/writer 204 has written the above-described information in the NFC tag of the MFP 102. When the mobile terminal 101 is brought in proximity to the MFP 102, the mobile terminal 101 can use an NFC communication function to obtain the same information as information that can be obtained from the above-described two-dimensional code, and can establish a Wi-Fi® connection with the MFP 102.

Similarly, when the Bluetooth® I/F 205 of the MFP 102 is ready to be used, the mobile terminal 101 can obtain the information by using a Bluetooth® low energy communication function of the mobile terminal 101, and can establish a Wi-Fi® connection with the MFP 102. Screens displayed on the MFP 102 after data is received from the mobile terminal 101 through Wi-Fi® communication will be described with reference to FIGS. 12 and 13.

When the MFP 102 receives transmission setting information indicating transmission settings from the mobile terminal 101 through Wi-Fi® communication, a pop-up screen, as illustrated in FIG. 12, on which a message indicating that transmission settings have been received from the mobile terminal 101 is output is displayed. A message field 1201 in FIG. 12 is a field for notifying the user that transmission settings have been received from a mobile terminal. When an OK button 1202 in FIG. 12 is pressed, the pop-up screen including the message field 1201 disappears, and a transmission screen illustrated in FIG. 13 is displayed.

Figure 13:
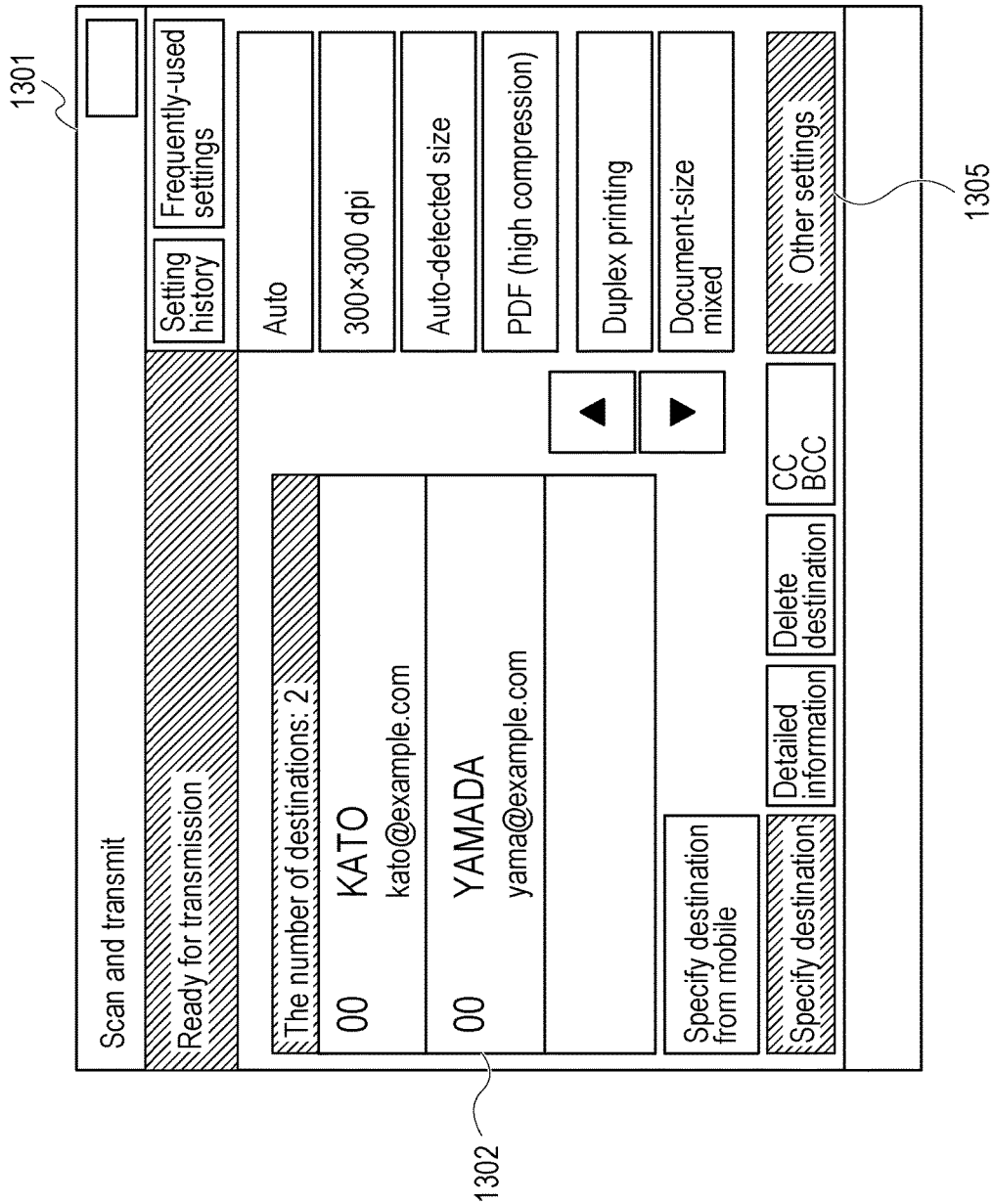
FIG. 13 is a diagram illustrating the transmission screen of the MFP which is displayed after destinations are set, according to the first embodiment.

When the MFP 102 receives transmission setting information from the mobile terminal 101 through the wireless LAN I/F 206, a screen 1301 illustrated in FIG. 13 is displayed, and the MFP 102 displays, in a destination list 1302, a mail address(es) that is set as a destination(s) from among the items included in the received transmission setting information. In FIG. 13, the title, the text body, and the file name that are received from the mobile terminal 101 are not displayed on the transmission screen 1301.

When an OTHER SETTINGS button 1305 is pressed, a menu list screen (not illustrated) for changing information about transmission is displayed. On the menu list screen, one of the transmission setting functions is selected so that a corresponding one of the received transmission settings can be checked and/or modified. In the destination list in FIG. 13, the example in which the name associated with a mail address received from the mobile terminal 101 and the mail address received from the mobile terminal 101 are displayed is illustrated. However, this is not limiting.

In another embodiment, just a mail address received from the mobile terminal 101 can be displayed. In yet another embodiment, just the name associated with a mail address received from the mobile terminal 101 can be displayed. When just a mail address is received as a destination from the mobile terminal 101, just the mail address of a destination can be displayed. If a received mail address is an address that has previously been registered in the MFP 102, the name corresponding to the received mail address and registered in the MFP 102 can be displayed. Thus, various configurations can be employed as the format in which a destination is displayed in the destination list.

When the MFP 102 transmits mail in the operation of "Scan and transmit", the mail address of the MFP 102 that is set in advance in the MFP 102 is used as a sender mail address. In the case where the MFP 102 is an MFP performing user management and where a mail address of a user who has logged in is registered in association with the user, the registered mail address is used as a sender mail address.

FIG. 14 illustrates capability information of the MFP 102 that indicates data items that are settable from the mobile terminal 101. An item 1401 describes the type of data. A Bit 1400 describes the number of a bit switch to which one of the types of data is assigned. Each of fields 1402, 1403, and 1404 indicates whether the item 1401 is settable depending on the model and version of an MFP. The data "1" indicates that the item 1401 is settable, and "0" indicates that the item 1401 is not settable.

In the example in FIG. 14, an MFP B can receive a mail address, a title, and a text body, but cannot receive a file name. In the first embodiment, in transmission of data such as a destination from the mobile terminal 101 to the MFP 102, the mobile terminal 101 obtains the capability information of the MFP 102 in advance, and just transmits items that the MFP 102 can receive. Thus, the capability is checked in advance, enabling the process to be performed without problems even when settable items are different because the program version of the mobile terminal 101 does not match that of the MFP 102.

Figure 15A:
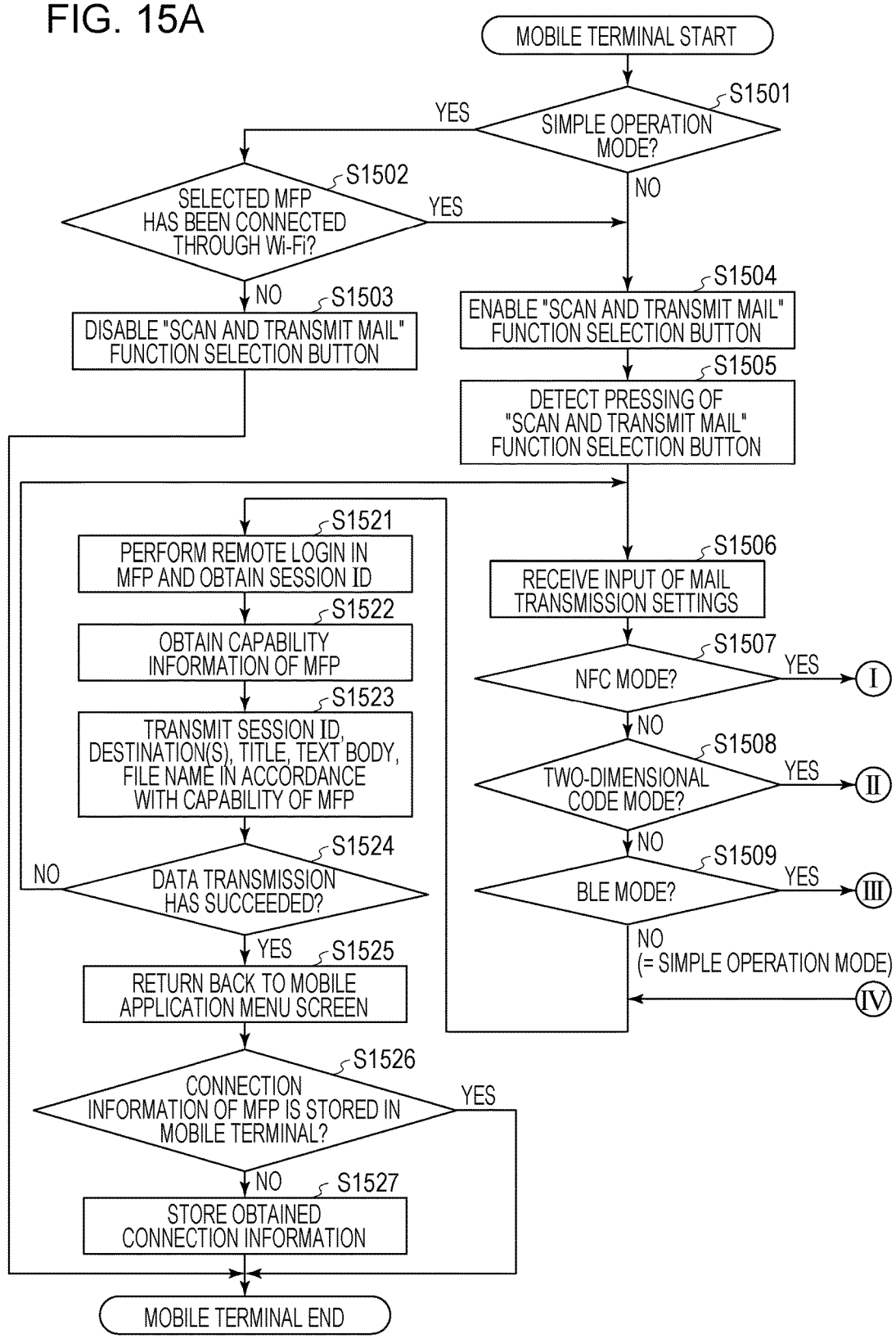

FIGS. 15A and 15B are flowcharts of an exemplary process in which the mobile terminal 101 transmits, to the MFP 102, transmission setting information indicating mail transmission settings including a destination, according to the first embodiment. The series of processes are performed in such a manner that, after a program which describes the procedure described below and that can be performed by the mobile terminal 101 is read from the ROM 308 into the RAM 309, the CPU 307 executes the program. The process in FIGS. 15A and 15B starts at a time point at which, after the mobile application is activated, the menu screen 406 of the mobile application illustrated in FIG. 4 is displayed.

In step S1501, when the mobile application is activated, the CPU 307 determines the connection mode. If the simple operation mode is specified as the connection mode, the process proceeds to step S1502, and it is determined whether the MFP that has been selected in the MFP-list display unit 405 in the menu screen 406 of the mobile application has been connected. That is, it is determined whether pairing has been performed between the mobile terminal 101 and the MFP (for discussion purposes, MFP 102) having been selected in the MFP-list display unit 405. If a connection has not been established (NO in the determination in step S1502), the process proceeds to step S1503, and the "Scan and transmit mail" function selection button 401 is disabled to prevent it from being pressed.

If a connection has been established (YES in the determination in step S1502), the process proceeds to step S1504, and the "Scan and transmit mail" function selection button 401 is enabled so that it can be pressed.

If a mode other than the simple operation mode is selected as the connection mode (NO in the determination in step S1501), the process also proceeds to step S1504, and the "Scan and transmit mail" function selection button 401 is enabled. In step S1505, when pressing of the "Scan and transmit mail" function selection button 401 is detected on the operation panel 301, the CPU 307 displays the mail-transmission setting screen 800 on the operation panel 301.

In step S1506, the CPU 307 receives input to the mail-address input fields (801, 802, and 803) and the mail-information input fields (804, 806, and 805) such as a title, on the operation panel 301. When the CPU 307 detects an input of each item, the CPU 307 stores the input data in the RAM 309. In subsequent steps S1507 to S1518, pairing is performed with the MFP 102. In steps S1507 to S1509, the connection mode set in the mobile terminal 101 is determined.

In step S1507, if it is determined that the connection mode is the NFC mode, the process proceeds to step S1510. In step S1510, when the CPU 307 receives, from the NFC I/F 305, a notification about detection of a touch operation to the NFC reader/writer 204 of the MFP 102, the process proceeds to step S1511. In step S1511, the CPU 307 obtains connection information used in pairing through the NFC I/F 305 from the NFC tag included in the NFC reader/writer 204 of the MFP 102. Next, in step S1519, the CPU 307 determines whether the obtained connection information includes direct connection information, i.e., SSID and KEY.

If the obtained information includes direct connection information, a direct-network wireless connection is established by using the SSID and KEY included in the connection information, the IP address of the MFP 102 is obtained, and pairing is performed in step S1520. If the information does not include direct communication information, the connection is to be a connection in the infrastructure mode. Therefore, in step S1518, the CPU 307 performs pairing with the MFP 102 by using the IP address in the obtained connection information.

In step S1521, the CPU 307 obtains user authentication information that is set by using the APPLICATION SETTING button 502 and that is stored in the HDD 310. The CPU 307 transmits a remote-login request to the IP address of the MFP 102 through the wireless LAN I/F 311. When remote login is completed, the MFP 102 generates a session ID, and the mobile terminal 101 obtains, from the MFP 102, the session ID generated by the MFP 102. In the following steps, the mobile terminal 101 communicates with the MFP 102 by using the session ID.

In step S1522, the CPU 307 obtains capability information of the MFP 102 through the wireless LAN I/F 311. In step S1523, the CPU 307 transmits data, such as a destination, a title, a text body, and a file name, which is stored in the RAM 309 in step S1506, as transmission setting information through the wireless LAN I/F 311 to the MFP 102 in accordance with the obtained capability information. At that time, the session ID obtained in step S1521 is also transmitted. The MFP 102 uses the session ID not to receive a data transmission request transmitted from another user. The details will be described with reference to FIG. 16.

In step S1524, the CPU 307 receives, from the MFP 102, a response to data transmission of the transmission setting information. If a response is successfully received, the process proceeds to step S1525, the mobile terminal 101 clears the inputs on the mail-transmission setting screen 800, and the display is returned back to the mobile application menu screen 406. A pop-up display describing that a response is successfully received can be provided when the screen transition is performed. If a response fails to be received, the process returns back to step S1506.

In step S1526, the CPU 307 determines whether the connection information of the MFP 102 to which data transmission has been performed is stored in the HDD 310 of the mobile terminal 101. If the connection information is not stored, the CPU 307 stores the connection information, such as the MAC address of the MFP 102, in the HDD 310 in step S1527. Thus, the MFP 102 with which data communication has been performed is registered in the mobile terminal 101.

The mobile terminal 101 can obtain pairing information (connection information) through NFC with an MFP that has not been registered, and the above-described processes can be performed. In this case, the unregistered MFP is registered. In the case where communication with an MFP has previously been performed using connection information, when communication with the MFP is to be performed subsequent times, the registration process enables data communication in the simple operation mode (YES in step S1501 and NO in S1509) to be performed in such a manner that the user selects the MFP from the MFP-list display unit 405. If the connection information has previously been stored (YES in the determination in step S1526), the process ends with no operations.

In step S1524, if a response indicating that data transmission has failed (NO in the determination) is received, the inputs on the mail-transmission setting screen 800 are held, and the process proceeds to step S1506. At that time, a pop-up display describing that data transmission has failed can be provided.

A process performed when it is determined that the connection mode is not the NFC mode in step S1507 will now be described.

In step S1507, if it is determined that the connection mode is not the NFC mode, the process proceeds to step S1508, and the CPU 307 determines whether the current connection mode is the two-dimensional code mode. If the current connection mode is the two-dimensional code mode, the process proceeds to step S1512. In step S1512, when the CPU 307 detects pressing of the SET TO DEVICE button 807 on the operation panel 301, the CPU 307 activates the camera 304 in step S1513.

When the camera 304 reads a two-dimensional code displayed on the MFP 102 in step S1514, the CPU 307 decodes data from the two-dimensional code, and obtains connection information of the MFP 102 in step S1515. When the connection information is obtained, the process proceeds to step S1519. After that, processes similar to those described in the case of the NFC mode are performed, and thus a detailed description is omitted.

In step S1508, if it is determined that the connection mode is not the two-dimensional code mode, the process proceeds to step S1509, and the CPU 307 determines whether the current connection mode is the Bluetooth® low energy mode. If the current connection mode is the Bluetooth® low energy mode, the process proceeds to step S1516. When the CPU 307 detects pressing of the SET TO DEVICE button 807 on the operation panel 301 in step S1516, the CPU 307 starts Bluetooth® low energy communication through the Bluetooth® I/F 306 in step S1517. When the connection information of the MFP 102 is obtained through Bluetooth® low energy communication, the process proceeds to step S1519. After that, processes similar to those described in the case of the NFC mode are performed, and thus a detailed description is omitted.

In step S1509, if it is determined that the connection mode is not the Bluetooth® low energy mode, this indicates that the connection mode is the simple operation mode. Therefore, the process proceeds to step S1521. A remote login request is then transmitted to the MFP 102 with which a Wi-Fi® connection has been established and that has been selected in step S1502. The processes after step S1521 are the same as those described in the case of the NFC mode, and thus a detailed description is omitted.

Figure 16:
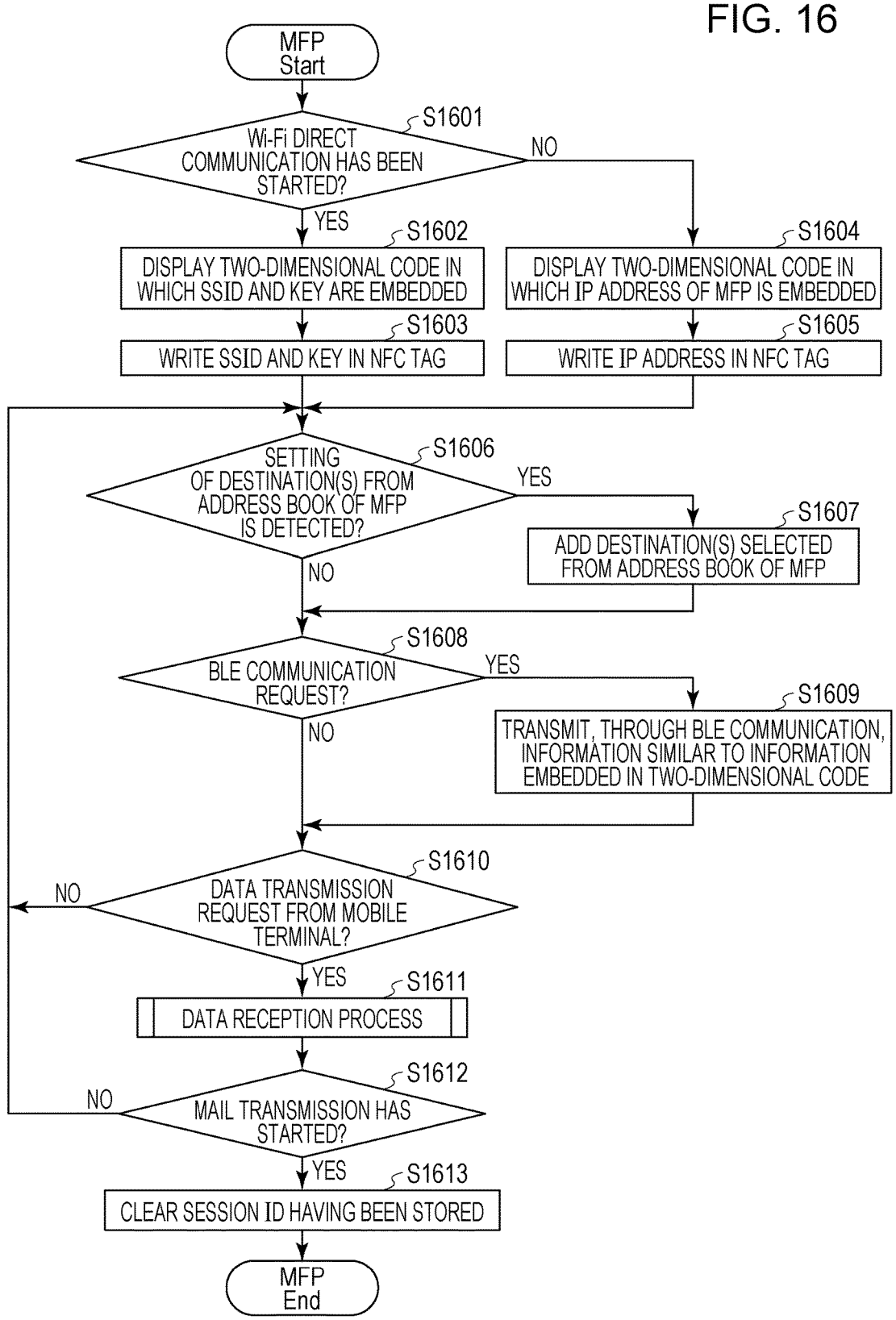
FIG. 16 is a flowchart of a process of setting mail destinations and transmitting mail, which is performed by the MFP according to the first embodiment.
Figure 17:
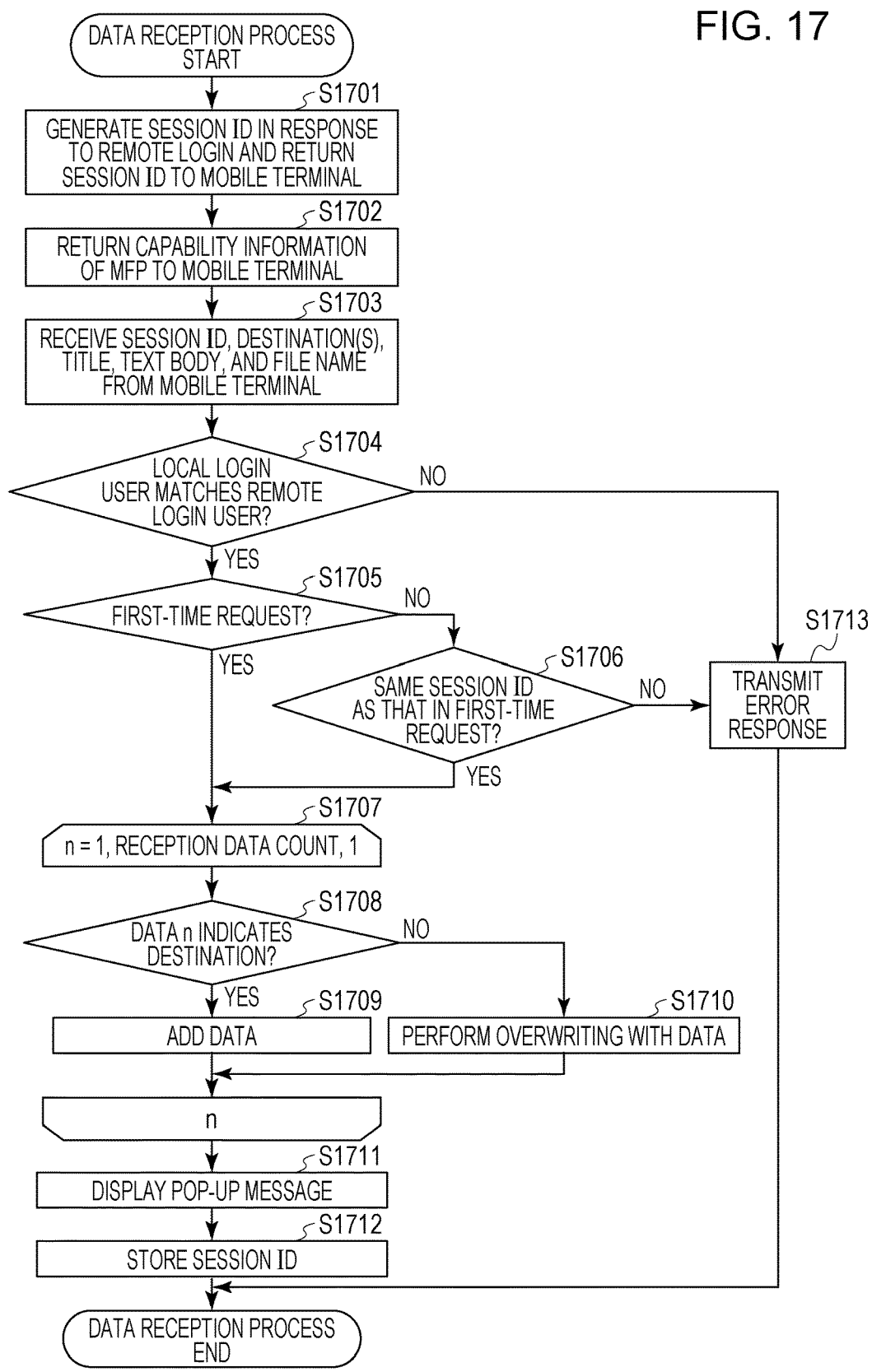
FIG. 17 is a flowchart of a data reception process of receiving data such as a destination from the mobile terminal, which is performed by the MFP according to the first embodiment.

FIGS. 16 and 17 are flowcharts of a process in which the MFP 102 receives, from the mobile terminal 101, a request to transmit a destination(s) and mail information, according to the first embodiment. The series of processes are performed in such a manner that, after a program that describes a procedure described below and that can be performed by the MFP 102 is read from the ROM 202 or the HDD 213 into the RAM 203, the CPU 201 executes the program.

The MFP 102 can perform user management. In the case where the MFP 102 does perform user management, it is assumed that the operation-unit controller 208 detects local login through the operation panel 209 of the MFP 102, and that a local-login process is performed. In the case where local login has been performed, when remote login is performed from the mobile terminal 101, it is determined whether the user who has performed the local login matches the user who has performed the remote login. In the case where the MFP 102 performs user management, the address corresponding to the user can be set as the sender mail address as described above, or the address book corresponding to the user can be used as the address book of the MFP 102.

In addition, the settings corresponding to the user can be set as the settings used in scanning. Thus, an MFP performing user management has various advantages. A description will be provided below under the assumption that the MFP 102 performs user management. However, the process according to the first embodiment is not limited to an MFP performing user management.

The process in FIG. 16 starts when the MFP 102 detects pressing of the SPECIFY DESTINATION FROM MOBILE button 908 on the "Scan and transmit" screen 901. In step S1601, the CPU 201 determines whether Wi-Fi® direct communication through the wireless LAN I/F 206 has been started. If Wi-Fi® direct communication has been started, the process proceeds to step S1602, and the CPU 201 displays, on the display 211, a two-dimensional code in which the SSID and KEY of a software access point for direct communication are embedded. In addition, the CPU 201 writes the SSID and KEY in the NFC tag of the MFP 102 through the NFC reader/writer 204 in step S1603.

In step S1601, if it is determined that direct communication has not been started, the CPU 201 determines that the infrastructure connection mode is to be used. In the case where the direct connection mode is to be used, as in the example in FIGS. 11A and 11B, and where communication has not been started, the process returns to S1601, and the CPU 201 waits for an instruction to start a direct connection, which is transmitted from the user (not illustrated). If it is determined that the infrastructure connection mode is to be used, a two-dimensional code in which the IP address of the MFP 102 is embedded is displayed on the display 211 in step S1604. In addition, the CPU 201 writes the IP address in the NFC tag of the MFP 102 through the NFC reader/writer 204 in step S1605.

In this state, when the mobile terminal 101 reads the two-dimensional code displayed on the display 211 of the MFP 102 or performs NFC communication, the mobile terminal 101 can obtain connection information necessary for pairing.

Then, the process proceeds to step S1606. In step S1606, the CPU 201 determines whether setting of a destination(s) from the address book screen 1001 of the MFP 102 is detected on the operation panel 209. If setting of a destination(s) on the address book screen 1001 of the MFP 102 is detected (YES in the determination), the process proceeds to step S1607, and the CPU 201 adds the destination(s) to the destination list 902 on the transmission screen 901.

As described above, the process in FIG. 16 indicates a process performed after the SPECIFY DESTINATION FROM MOBILE button 908 in FIG. 9 is pressed. That is, the processes in steps S1606 and S1607 are those performed after the SPECIFY DESTINATION FROM MOBILE button 908 is pressed, when a destination(s) is further set on the address book screen 1001 of the MFP 102. Therefore, a destination(s) can be set on the address book screen 1001 of the MFP 102 similarly to the processes in steps S1606 and S1607 before the SPECIFY DESTINATION FROM MOBILE button 908 in FIG. 9 is pressed.

The process then proceeds to step S1608, and the CPU 201 determines whether the Bluetooth® I/F 205 receives a Bluetooth® low energy communication request from the mobile terminal 101. If it is determined that a Bluetooth® low energy communication request is received, the process proceeds to step S1609. In step S1609, the CPU 201 performs Bluetooth® low energy communication with the mobile terminal 101 through the Bluetooth® I/F 205. The CPU 201 transmits, to the mobile terminal 101, information similar to the information that is embedded in the two-dimensional code, and the process proceeds to step S1610. In step S1608, if it is determined that a Bluetooth® low energy communication request has not been received, the process also proceeds to step S1610.

In step S1610, the CPU 201 detects a data transmission request from the mobile terminal 101 by using the wireless LAN I/F 206. If a data transmission request has not been received, the process returns to step S1606. If it is determined that a data transmission request has been received, the data reception process in step S1611 is performed. The data reception process is a process of receiving transmission setting information indicating mail transmission settings. The data reception process will be described in detail with reference to the flowchart in FIG. 17.

When the data reception process ends, the process proceeds to step S1612, and the CPU 201 determines whether an input for mail transmission start is detected on the operation panel 209. If an input for mail transmission start is detected, the process proceeds to step S1613, and the CPU 201 clears the session ID stored in step S1611 (described below with reference to FIG. 17), and ends the process. If an input for mail transmission start is not detected, the process returns to step S1606.

When the CPU 201 detects an input of mail transmission start, the CPU 201 collaborates with the scanner 215 to read a document and generate image data. When reading of a document is completed, the generated image data is transmitted to the destination(s) that is set, and the process ends.

FIG. 17 is a flowchart describing the details of the data reception process in step S1611.

In step S1701, when the wireless LAN I/F 206 or the network I/F 207 detects a remote login request from the mobile terminal 101, the CPU 201 generates a session ID and transmits the generated session ID to the mobile terminal 101.

In step S1702, the CPU 201 transmits, to the mobile terminal 101, capability information of the MFP 102 illustrated in FIG. 14 through the wireless LAN I/F 206 or the network I/F 207. In step S1703, the CPU 201 receives a data transmission request including a destination(s) and the like, from the mobile terminal 101 through the wireless LAN I/F 206 or the network I/F 207. The data transmission request received in this step includes setting information about setting of at least one setting item for the mail transmission function.

The process then proceeds to step S1704. If the MFP 102 performs user management, it is determined whether the local login user matches the remote login user detected in step S1701. This check is performed in order to ensure that the user who transmitted data, such as a destination, from the mobile terminal 101 is present in front of the MFP 102. If a user who is registered in the mobile terminal 101 has performed local login to the MFP 102, the user is regarded as being present in front of the apparatus. Therefore, if the local login user does not match the remote login user in step S1704, the process proceeds to step S1713, in which an error response is returned to the mobile terminal 101 and the process ends. If the local login user matches the remote login user, or if the MFP 102 does not perform user management, the process proceeds to step S1705.

In steps S1705 and S1706, the CPU 201 checks the session ID included in the request from the mobile terminal 101. This process is performed in order that, in a period from a time point at which a certain user transmits data, such as a destination, from the mobile terminal 101 to a time point at which the user starts mail transmission, reception of a data transmission request transmitted from another user is rejected. In step S1705, the CPU 201 determines whether the received request is a first-time request.

In the case where a request from the mobile terminal 101 is received, the CPU 201 stores the session ID transmitted in the request in the RAM 203 in step S1712 as described below. The session ID is stored until mail transmission is started in step S1612 in FIG. 16. Therefore, in the initial state and after a mail transmission job is submitted, the session ID is not left in the RAM 203. Therefore, it is determined whether this is a first-time request by checking whether the session ID is present in the RAM 203 in step S1705.

If it is determined that this is a first-time request because the session ID is not stored in the RAM 203, the process proceeds to step S1707, and the CPU 201 perform a setting process using the received data. If it is determined that this is not a first-time request (NO in the determination in step S1705), then in step S1706, the CPU 201 determines whether the session ID included in the request received in step S1703 is the same as the session ID stored in the RAM 203.

If the session IDs are different from each other, this is a request transmitted from a mobile terminal different from the mobile terminal from which the first-time request has been transmitted. Therefore, the request is not received, and an error is returned to the mobile terminal (step S1713). If it is determined that the session IDs are the same, the process proceeds to step S1707 in which the request is received.

In step S1707, the CPU 201 performs a loop process from step S1708 to step S1710, which is described below, as many times as the number of data items included in the request received in step S1703. In step S1708, it is determined whether the item for data "n" indicates a destination(s), for example, a destination(s) in the mail address field 801, 802, or 803. If the item indicates a destination(s), the process proceeds to step S1709, and the CPU 201 stores the data in the RAM 203 in an "adding" manner. That is, the received destination(s) is added to the destination list which is currently set in the MFP 102.

If no destinations are included in the destination list that is currently set in the MFP 102, the received destination(s) is registered in the destination list and is displayed. Thus, a destination item is set in an adding manner. Even when a destination(s) has previously been set in the MFP 102, for example, in step S1607 in FIG. 16 or before start of the process in FIG. 16, the destination(s) can be added without the existing destination(s) being deleted. In addition, a destination(s) can repeatedly be added from the mobile terminal.

If the item for data "n" is an item other than the destination items, e.g., the title, the text body, or the file name, the process proceeds to step S1710, and the CPU 201 stores the data in the corresponding item previously stored in RAM 203, in an "overwriting" manner. Data is stored in an item other than the destination items in an overwriting manner is because the mobile terminal 101 often has a higher operability than the MFP 102, information that is set by using the mobile terminal 101 matches a user's intention better than information set by using the MFP 102.

Since a setting item of the MFP 102 is overwritten with an item that is set by using the mobile terminal 101, previously set data can be easily changed. Even when the item for data "n" is an item other than the destination items, if the data "n" is a blank, the CPU 201 does not "overwrite" the item previously stored in the RAM 203 with the data n that is a blank. This is because, if the existing item is "overwritten" with blank data, the previously stored item will become blank, which can result in a state unintended by the user.

Thus, information that is set from the mobile terminal 101 is to be set with priority in most cases. However, for a destination(s), an "add" process is performed in consideration of various types of convenience in the first embodiment.

When the loop process is completed, the process proceeds to step S1711, and the CPU 201 displays, on the display 211, a pop-up message describing that data, such as a destination, has been set from the mobile terminal 101. In step S1712, the CPU 201 stores, in the RAM 203, the session ID obtained from the request, and ends the process.

As described above, according to the first embodiment, setting of a destination(s) on the transmission screen for mail can be performed from both the address book of an MFP and the address book of a mobile terminal. The process according to the first embodiment is useful especially when broadcast transmission is performed. Since broadcast transmission enables selection of multiple destinations, the same information can be mailed to multiple destinations in a single transmission process.

For example, assume that a user first tries to select a transmission target(s) from the address book of an MFP, but there is a destination that is not included in the MFP's address book. In this case, the user adds the destination from the address book of the mobile terminal, or sets the destination to the MFP through a UI or the like of the mobile terminal. Instead, the user can first set various transmission items from the mobile terminal, and can then set again the various transmission items from the mobile terminal.

Modified Embodiments

In the above-described embodiment, the example in which setting is performed for a mail transmission function of an MFP from an external apparatus such as a mobile terminal is described. However, embodiments are not limited to setting for a mail transmission function. That is, as long as it is determined how information that is received from an external apparatus and that is to be set to an MFP for a predetermined function, e.g., a fax transmission function, is set in the MFP in accordance with the item in which the received information is to be set, such a configuration is included in the embodiments. For example, whether received information is to be added to information previously set in an MFP, i.e., setting in an adding manner, or the information previously set in the MFP is to be overwritten with the received information, i.e., setting in an overwriting manner or in a newly setting manner, can be determined in accordance with the setting item.

The above-described embodiment describes, as an example, the case in which data (image data) obtained by using a scanner function provided for an MFP is transmitted. However, this is not limiting. For example, MFPs include a function called BOX for storing various data. Data stored using the BOX function can be transmitted as an attached file when necessary.

When an MFP includes a function of obtaining various types of state information, i.e., such as a mail transmission history, of the MFP, embodiments can be applied to a configuration in which information, i.e., mail transmission history, obtained by using the function is transmitted as an attached file. As long as the data is described in text format, another configuration other than an attached file can be employed.

An MFP is used as an example of an information processing apparatus in the above-described embodiment. However, the example of an MFP is not limiting. That is, any apparatus for which transmission items are set in a mobile terminal can be an information processing apparatus having a function of transmitting mail. Any type of information processing apparatus is applicable if the information processing apparatus includes a configuration in which data about a function provided for the information processing apparatus can be mailed as an attached file.

Thus, as long as an apparatus implementing multiple functions, including a mail transmission function, transmits, using the mail transmission function, data or information obtained by using a function provided for the apparatus, the process according to the above-described embodiment is applicable.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The embodiment(s) avoid deleting, when an MFP, based on information transmitted from another apparatus, sets a transmission destination(s) used in a mail transmission function of the MFP, a destination(s) previously set in the MFP as a transmission destination(s).

While exemplary embodiments have been provided, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-242206 filed Dec. 11, 2015, which is hereby incorporated by reference herein in its entirety.

What is claimed is:

1. An information processing apparatus comprising:
a user interface that receives a user instruction;
a controller that sets a destination based on the user instruction received by the user interface; and
a communicator that receives a destination selected on an external apparatus and information set by a user on the external apparatus,
wherein the controller performs a process for transmission of data based on the information to the destination set via the user interface and the destinateion selected on the external apparatus based on one transmission start instruction received via the user interface.

2. The information processing apparatus according to claim 1, wherein the controller set the destination received from the external apparatus without selection, by a user via the user interface, of the destination received from the external apparatus.

3. The information processing apparatus according to claim 1, wherein
the information is a different type of information from the destination, and
wherein the controller changes information already set in the information processing apparatus with the received information.

4. The information processing apparatus according to claim 3, wherein
the controller does not change the information already set in the information processing apparatus if the destination is selected on the external apparatus and the information is not set on the external apparatus.

5. The information processing apparatus according to claim 1, wherein the information includes at least one setting of a title, a text body, or a file name of an attached file transmitted by performing the process for transmission.

6. The information processing apparatus according to claim 1, wherein the communicator receives the destination via wireless communication.

7. The information processing apparatus according to claim 6, wherein
the controller provides, for the external apparatus, connection information necessary to establish the wireless connection with the external apparatus,
wherein the connection information is provided using at least Bluetooth® low energy communication, or NFC communication.

8. The information processing apparatus according to claim 6, wherein the user interface displays a two dimensional code for establishing trhe wireless connection with the external apparatus.

9. The information processing apparatus according to claim 1, further comprising:
a receiver that receives data to be transmitted, wherein the controller performs a process for transmission of the received data to the destination set by the controller and the destination selected on the external apparatus.

10. The information processing apparatus according to claim 1, further comprising:
a scanner,
wherein the data is an email which includes image data generated by scanning a document with the scanner.

11. The information processing apparatus according to claim 1, the user interface displays a confirm screen in accordance with setting a transmission destination based on the received destination.

12. The information processing apparatus according to claim 11, wherein the confirm screen indicates that the destination has been received from the external apparatus.

13. A method of controlling an information processing apparatus including a user interface, the method comprising:
receiving a user instruction via the iser interface;
set a destination based on the user instruction received by the user interface;
receiving a destination selected on an external apparatus and information set by a user on the external apparatus; and
transmitting data based on the informaton to the destination set via the user interfqace and the destination selected on the external apparatus based on one transmission start instruction received via the user interface.

14. A non-transitory computer-readable storage medium storing computer executable instructions causing a control method to be performed by an information processing apparatus that includes a user interface, the control method comprising:

receiving a user instruction via the user interface;
set a destination based on the user instruction received by the user interface;
receiving a destination selected on an external apparatus and information set by a user on the external apparatus; and
transmitting data based on the information to the destination set via the user interface and the destination selected on the external apparatus based on one transmission start instruction received via the user interface.

* * * * *